United States Patent
Lipton et al.

(10) Patent No.: US 9,191,647 B2
(45) Date of Patent: *Nov. 17, 2015

(54) DEMULTIPLEXING FOR STEREOPLEXED FILM AND VIDEO APPLICATIONS

(71) Applicant: RealD Inc., Beverly Hills, CA (US)

(72) Inventors: Lenny Lipton, Los Angeles, CA (US); Robert Akka, Sausalito, CA (US); Matt Cowan, Bloomingdale, CA (US); Josh Greer, Beverly Hills, CA (US)

(73) Assignee: RealD Inc, Beverly Hills, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/300,054

(22) Filed: Jun. 9, 2014

(65) Prior Publication Data

US 2015/0009287 A1  Jan. 8, 2015

Related U.S. Application Data

(63) Continuation of application No. 12/286,449, filed on Sep. 29, 2008, now Pat. No. 8,749,615, which is a continuation-in-part of application No. 11/811,234, filed on Jun. 7, 2007, now Pat. No. 8,487,982, and a continuation-in-part of application No. 11/811,047, filed on Jun. 7, 2007, now Pat. No. 8,373,744.

(51) Int. Cl.
*H04N 13/00* (2006.01)
*H04N 15/00* (2006.01)
*H04N 19/597* (2014.01)

(52) U.S. Cl.
CPC ....... *H04N 13/0048* (2013.01); *H04N 13/0059* (2013.01); *H04N 19/597* (2014.11)

(58) Field of Classification Search
USPC ................................. 348/43, 47, 49
See application file for complete search history.

(56) References Cited

U.S. PATENT DOCUMENTS

| 4,658,291 A | 4/1987 | Morishita |
| 4,672,443 A | 6/1987 | Dischert et al. |

(Continued)

FOREIGN PATENT DOCUMENTS

| CN | 1613283 | 5/2005 |
| EP | 1024672 | 8/2000 |

(Continued)

OTHER PUBLICATIONS

Anonymous, "Draft AVC amendment text to specify Constrained Baseline profile and supplemental enhancement information (G.Sullivan, A. Tourapis, and T. Yamakage) ( Conveyed to WG 11 as Text of ISO/IEC 14496-10:200X/FDPAM 1 Constrained Baseline profile and supplemental enhancement information)", 30. JVT Meeting; 29-1-2009-22-2009; Geneva, (Joint Video Team of ISO/IEC JTC1/JSC29/WG11 and ITU-T SG.16), No. JVT-AD204 Jul. 7, 2009, XP030007462, ISSN: 0000-0079.

(Continued)

*Primary Examiner* — Jeremaiah C Hallenbeck-Huber
(74) *Attorney, Agent, or Firm* — Darlene K. Kondo; Neil G. J. Mothew

(57) ABSTRACT

A method for demultiplexing frames of compressed image data is provided. The image data includes a series of left compressed images and a series of right compressed images, the right compressed images and left compressed images compressed using a compression function. The method includes receiving the frames of compressed image data via a medium configured to transmit images in single frame format, and performing an expansion function on frames of compressed image data, the expansion function configured to select pixels from the series of left compressed images and series of right compressed images to produce replacement pixels to form a substantially decompressed set of stereo image pairs. Additionally, a system for receiving stereo pairs, multiplexing the stereo pairs for transmission across a medium including single frame formatting, and demultiplexing received data into altered stereo pairs is provided.

21 Claims, 15 Drawing Sheets

(56) References Cited

U.S. PATENT DOCUMENTS

| | | | |
|---|---|---|---|
| 4,790,028 | A | 12/1988 | Ramage |
| 5,193,000 | A | 3/1993 | Lipton et al. |
| 5,416,510 | A | 5/1995 | Lipton et al. |
| 5,537,144 | A | 7/1996 | Faris |
| 5,615,287 | A | 3/1997 | Fu et al. |
| 5,627,582 | A | 5/1997 | Muramoto et al. |
| 5,767,898 | A | 6/1998 | Urano et al. |
| 6,331,902 | B1 | 12/2001 | Lin |
| 6,453,074 | B1 | 9/2002 | Zheng |
| 6,714,688 | B1 | 3/2004 | Gallagher et al. |
| 7,158,158 | B1 | 1/2007 | Fleming |
| 7,580,463 | B2 | 8/2009 | Routhier et al. |
| 7,728,900 | B2 | 6/2010 | Fukushima et al. |
| 7,941,001 | B1 | 5/2011 | Sahu et al. |
| 2004/0120396 | A1 | 6/2004 | Yun et al. |
| 2005/0117637 | A1 | 6/2005 | Routhier et al. |
| 2007/0140569 | A1 | 6/2007 | Tabuchi et al. |
| 2007/0183650 | A1 | 8/2007 | Lipton et al. |

FOREIGN PATENT DOCUMENTS

| | | |
|---|---|---|
| JP | H10-257431 | 9/1998 |
| KR | 1020070027318 | 3/2007 |
| WO | 03088682 | 10/2003 |
| WO | 2007040472 | 4/2007 |

OTHER PUBLICATIONS

Vetro, A., "MVC Profile/Level Definitions for Stereo", 28 JVT Meeting; 85. MPEG Meeting; Jul. 20-25, 2008; Hannover; (Joint Video Team of ISO/IEC JTC1/SC29/WG11 and ITU-T SG.16), No. JVT-AB037 Jul. 20, 2008, XP030007423, ISSN: 0000-0090.

Office Action from Chinese Application No. 200980147936.4, dated Nov. 14, 2012.

Office Action from Japanese Application No. JP2010-511173, dated Feb. 2, 2013 (English translation).

Supplemental European Search Report from EP Application No. 09817048 dated Sep. 11, 2012.

Examination Report in co-pending EP application No. 08768074.0 mailed Aug. 9, 2011.

Examination Report in co-pending EP application No. 08768072.4 mailed Aug. 9, 2011.

Soga et al., Development of a Digital 3D Broadcasting System Using Progressively Scanned Digital Broadcasting, SPIE vol. 3295; XP008022107 (1998).

European Search Report in co-pending EP application No. 08768074.0 mailed Jul. 8, 2010.

European Search Report in co-pending EP application No. 08768072.4 mailed Jul. 8, 2010.

International search report and written opinion of international searching authority of PCT/US2008/006986, dated Nov. 19, 2008.

International search report and written opinion of international searching authority of PCT/US2009/058845, dated Jan. 13, 2010.

DEMULTIPLEXING FOR STEREOPLEXED FILM AND VIDEO APPLICATIONS

This application is a continuation-in-part of co-pending U.S. patent application Ser. No. 11/811,234, entitled "Stereoplexing for Film and Video Applications", filed Jun. 7, 2007, inventors Lenny Lipton, et al., and is also a continuation-in-part of co-pending U.S. patent application Ser. No. 11/811,047, entitled "Stereoplexing for Video and Film Applications", also filed Jun. 7, 2007, inventors Robert Akka, et al., both of which are incorporated herein by reference.

BACKGROUND OF THE INVENTION

1. Field of the Invention

The present invention relates generally to placing stereoscopic data within a single image channel and retrieving stereoscopic data from the single image, wherein an image channel originally designed to carry planar movie signals carries a piano-stereoscopic or two-view stereoscopic image.

2. Description of the Related Art

Stereoscopic imaging is gaining in popularity, especially the plano-stereoscopic imaging technology that uses two planar images to produce a stereoscopic effect. However, the infrastructure established for electronic storage and distribution has been for a single planar image of the requisite quality. In order to store and transmit a commercially viable stereoscopic movie or image series, such data must operate within the existing infrastructure requirements and must also meet the specifications for image quality. A certain image quality level is expected of a planar image, and the stereoscopic image should barely be diminished with respect to that standard.

The quality of the planar image—in simple terms its sharpness, its color depth, the gradation of the image, in other words its fidelity—is dependent upon the bandwidth allocated to the image. To then attempt to place two images, a left and a right, within the existing bandwidth pipeline is to invite image compromise. The problem at hand can be stated as such: How can the stereoscopic designer maintain planar image quality even when a moving image stereoscopic pair is inserted into the existing storage and distribution pipeline?

Numerous attempts have been made to combine stereoscopic television (video) images and motion picture images to fit within the allocated transmission pipeline used for a single planar image. In some cases, especially for television images, designers have been concerned with the issue of backward or downward compatibility. Backward or downward compatibility would ensure that the stereoscopic signal can be constrained to be invisible to existing television receivers.

The present design seeks to cure the problem of transmitting stereoscopic images and movies over the existing infrastructure, which had been designed to transmit single planar images. It would be advantageous to offer a design that can provide multiplexed and demultiplexed stereoscopic images without the need to replace existing components, and particularly a design that offers benefits over those previously available.

SUMMARY OF THE INVENTION

According to one aspect of the present design, there is provided a method for demultiplexing a stream of single frames divided into portions, each single frame representing a frame of one stereoscopic image and containing one right image in a first portion and one left image in a second portion, each portion having been compressed using a compression function. The method comprises receiving the stream of single frames divided into portions, each single frame representing a frame of one stereoscopic image, and performing a reverse compression function on at least one of the portions, the reverse compression function substantially processing pixels in the at least one portion in a manner substantially the reverse of the compression function used to compress each portion. Performing the reverse compression function substantially reverts the portion to a state similar to that prior to being compressed using the compression function, thus forming a part of a stereo pair configured for projection.

According to a second aspect of the present design, there is provided a method for demultiplexing frames of compressed image data comprising a series of left compressed images and a series of right compressed images, the right compressed images and left compressed images compressed using a compression function. The method comprises receiving the frames of compressed image data via a medium configured to transmit images in single frame format, and performing an expansion function on frames of compressed image data, the expansion function configured to select pixels from the series of left compressed images and series of right compressed images to produce replacement pixels to form a substantially decompressed set of stereo image pairs.

According to a third aspect of the present design, there is provided a system configured to provide stereoscopic images. The system comprises a multiplexer configured to receive a plurality of stereo pairs, compress said stereo pairs into compressed portions, and combine the compressed portions into a series of single frames representing the plurality of stereo pairs, a transmission medium configured to transmit single frames of image data and configured to receive the series of single frames, and a demultiplexer configured to receive the series of frames from the transmission medium and decompress the series of single frames into a reconstructed plurality of stereo pairs.

Multiplexing processes such as staggering, alternating, filtering, variable scaling, and sharpening from original, uncompressed right and left images may be employed alone or in combination, and selected or predetermined regions or segments from uncompressed images may have more pixels removed or combined than other regions, or otherwise compressed to different quality levels than other regions.

These and other advantages of the present invention will become apparent to those skilled in the art from the following detailed description of the invention and the accompanying drawings.

BRIEF DESCRIPTION OF THE DRAWINGS

The present invention is illustrated by way of example, and not by way of limitation, in the figures of the accompanying drawings in which.

DETAILED DESCRIPTION OF THE INVENTION

Figure 1:
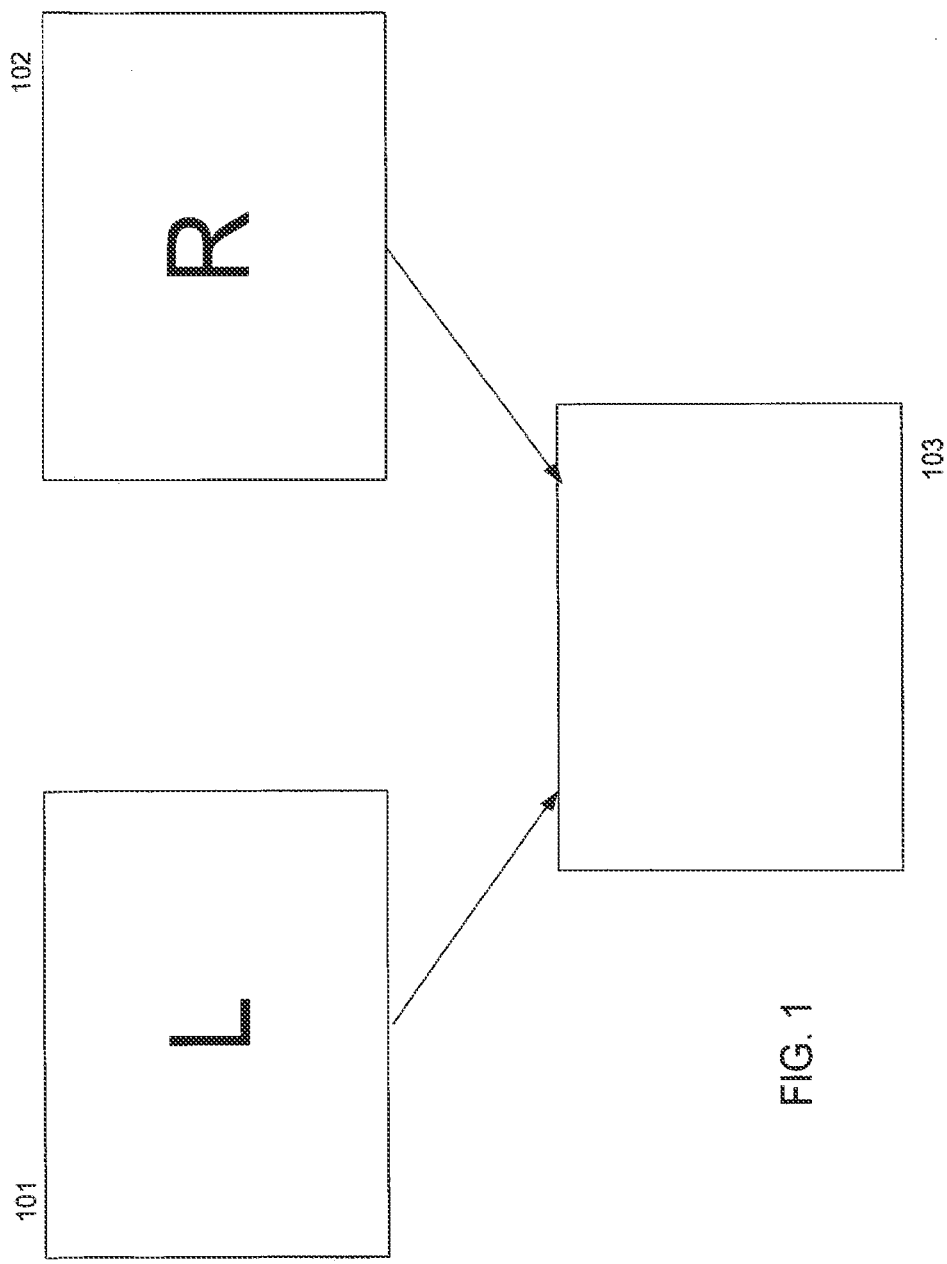
FIG. 1 shows taking two stereo source image components and multiplexing them to fit in a frame that is typically of the same size as either of the two image components.

The present design provides a means for transmitting stereoscopic images over existing infrastructure originally designed to transmit planar images. The present design is described in a series of related techniques. The concentration is on the multiplexing and demultiplexing of the stereoscopic image, where multiplexing is termed the "stereoplexing" of the image. Two major requirements exist for stereoscopic imaging, one for distribution to theaters (film) and the other for home entertainment (video).

In general, video applications involve removing pixels from source image data and optimization in a video system that allows for playback using a variety of display monitors and selection technologies. Film applications are used for field sequential or temporal multiplexing, where the resultant stereoscopic images are shown on big theater screens. In general, compression is less for film applications than video applications, with an emphasis on variable compression across the frame width with a very sharp center area and sharpening at the edges to get the most out of the data transmitted.

Digital cinema at this point in time is making remarkable inroads, and a significant percentage of digital cinemas in the world today have stereoscopic capability. The ability to deal with left and right channels has been addressed within the existing professional motion picture standards with regard to signal or data transmission from a server to a projector.

In many instances the transmission of a live and not prerecorded event is required. In this case the bandwidth benefits afforded by a closed-circuit server hooked up directly to a projector are no longer available, because landlines and satellite transmission are designed to contain but one planar signal. The present design seeks to stereoplex the left and right signals to fit within the existing planar bandwidth commonly employed for both landlines and satellite transmission.

Because theatrical cinema imaging standards are extremely high, the problem becomes a difficult one to solve. It is not sufficient to force two images within the existing bandwidth and have the images survive at a reduced quality standard. The image must maintain the high performance standards that are associated with the theatrical cinema. Fortunately theatrical cinema images, although compressed, are compressed far less than television images. A typical compression for theatrical cinema images is 15:1, thus somewhat reducing the burden on the stereoplexing technology.

Stereoplexing/Multiplexing

For stereoplexing for the cinema as well as for the home, no matter how the stereo pair of moving images is packaged, the stereo pair must survive the additional compression technology that is part of the motion picture infrastructure. In the case of the motion picture infrastructure, the compression standard that is most widely adopted is JPEG (Joint Photographic Experts Group) 2000. This protocol allows for high quality image transmission but with relatively modest compression. In the television realm for digital distribution of content on discs, for example, such as Blu-Ray or HD-DVD, compression ratios more in the range of 50:1 or 70:1 are prevalent, and these use the protocols such as MPEG (Motion Picture Experts Group) protocol.

Thus the multiplexing technology that combines the left and right stereo images into a single planar frame must in addition enable the images to survive the infrastructure compression protocols such as JPEG or MPEG. It must do all of this and produce an image commensurate in quality with the planar image for either motion pictures or television.

Such a task is similar to the introduction of NTSC (National Television System Committee) color television in the early '50s. A colorplexed signal was added in such a way as to not degrade the existing monochrome reception. Therefore, black-and-white televisions were able to pick up color broadcasts without any significant image impairment; whereas the new color television sets could play monochrome and also make use of the color signal for adding color information to the picture.

Downward compatibility is highly prized, but adds certain levels of complexity to the stereoplexing problem. Downward compatibility may not be required in today's environment. When NTSC color was introduced, a limited number of channels existed and there was no means for the user to play recorded content such as VHS tapes or DVD discs. Today the situation is different. Hundreds of channels are available on cable television, off-the-air television is available, and the ability exists to play back prerecorded discs. With this variety of options available, one needs to question the downward compatibility requirement for stereoscopic television—users can typically find something to watch without the need to have a fully downward compatible version of the highest quality technology. For motion pictures downward compatibility is simply not required because of the closed circuit nature and non-distribution of movie theater content to the outside world.

While not currently widely available, television can support some channels devoted to stereoscopic programming, and in the case of discs, for example, a precedent has been established wherein the letterbox format has been placed on one side of the disc and the Edison aspect ratio (1.3:1) on the other side of the disc, or occasionally included as separate data on the same side of the disc. Therefore, it seems appropriate that in today's environment a disc might have a planar version of a movie on one side and the stereoscopic version on the other, or stored in separate areas of the same side of the disc, or perhaps included on a different disk in the same retail package.

It is also possible for any stereoscopic storage scheme to be backward or downward compatible with monoscopic displays, in that there is the option to only display one of the two stereo views (i.e. just the left-eye view) on a monoscopic display.

Several different but related stereoplexing techniques are described that can be used singly or in combination, and these are delineated in greater detail below.

Several general container approaches may be employed to produce a precursor format. A precursor format is a format that, while encoding the stereoscopic information, is adaptable with regard to the use of that information so that different displays and selection devices may be employed, and additionally, is adaptable with regard to the storage or transmission medium. Thus, the precursor format can be considered a sort of "macro-format," which can accommodate different formats of pixel storage schemes within the larger layout scheme. Use of this precursor format can be employed to optimize for the storage or transmission medium and/or the intended type of display, or optimize for display format versatility. For example, stereoscopic image selection could take place by means of anaglyph (red and green glasses), by the time-sequential method, by the polarization method, or by methods that have been enunciated in the past involving interlace, or micropolarizer technology, or the diagonal interlace that is a feature of certain DLP projectors.

Accordingly, the precursor format must have eclectic potential in the sense that, while containing the left and right perspective information, such information must be contained in a format that can then be used to greatest advantage dependent upon the projection or display format—or the monitor format and the stereoscopic image selection technology associated with that format, be it shuttering eyewear or passive eyewear or whatever may be desired. In order to have a commercially viable solution, the best approach is to use a precursor protocol described herein and, as mentioned, the concentration in this discussion is on the stereoplexing technology rather than the demultiplexing technology. Stereoplexing technology is software-dependent, and computers can be configured with software programs in, for example, post-production suites to accomplish stereoplexing.

On the other hand, motion picture projection or television sets require simplicity and low cost of goods. Here the solution, rather than being a software solution that can be extremely complex, is a hardware or firmware solution that is relatively simple and inexpensive.

Of the general methods that are described herein, one is the side-by-side multiplexing approach, in which the format is divided by a vertical line and the left and right images are placed into either the left or right half of the containers respectively. Obviously, for whatever reasons, the left image information could be on the right-hand of the frame and vice versa; and other dispositions of the information, such as above-and-below, are obvious extensions or alternatives of these teachings.

Another approach uses what is called the "quad-tile" approach, in which there are four tiles arranged with the left and right information distributed in two tiles each. In other words, the left information occupies two tiles, and the right information occupies two tiles. It will be explained below why this approach has certain advantages.

By following these and other precursor format approaches and taking care of certain other appropriate concerns, the image can survive being compressed according to compression schemes such as JPEG or MPEG. In addition, using the test results, psychophysical tests have been performed comparing uncompressed and compressed data. The images compressed according to these teachings survive compression and decompression and appear to have very nearly the same quality as the original uncompressed images. By "very nearly" it is meant that the only way to detect that the image has been compressed and uncompressed is for an observer to be positioned very close to the screen—much closer than any normal theater patron would be in a typical theater seating configuration, and additionally, to be concentrating specifically on particular details and looking for minor differences.

In addition to these precursor format containers, a description will be given for selecting pixels—in other words, pixel-plucking or sampling techniques that can then arrange the pixels to within the precursor container formats described. For a high quality stereoscopic experience, significant attention should be paid to this part of the process so that the resulting image will have minimal losses.

Yet another technique employed is where the stereoscopic or stereoplexing compression is varied across the width of the frame. In the simplest case, the least compression occurs in the middle of the frame because that is typically where the eyes' attention will be drawn in actual operation.

From FIG. 1, two stereo pair elements are shown, a left-eye view image 101 and a right-eye view image 102, that need to be stored in a frame 103, generally of equal size to either of the two stereo pair element images. Typically, each of the two stereo pair elements has a quality appropriate for non-stereoscopic viewing using the same general kinds of video storage, image processing, and display systems. For example, for a storage and display system that normally handles 1920×1080 pixel images at a particular standard of quality, one would expect that stereo pair elements handled by the same kind of system will each be of a similar quality, and therefore should normally be of the same pixel resolution. In other words, with a system that normally handles 1920×1080 content, it will be common for left-eye and right-eye elements to each be 1920×1080 as well.

Several techniques may be used in different combinations for multiplexing stereoscopic information into a single frame, or more specifically, to graphically compress either of the two stereo pair elements to fit the half-frame field that is allocated to it by the precursor format.

Figure 2:
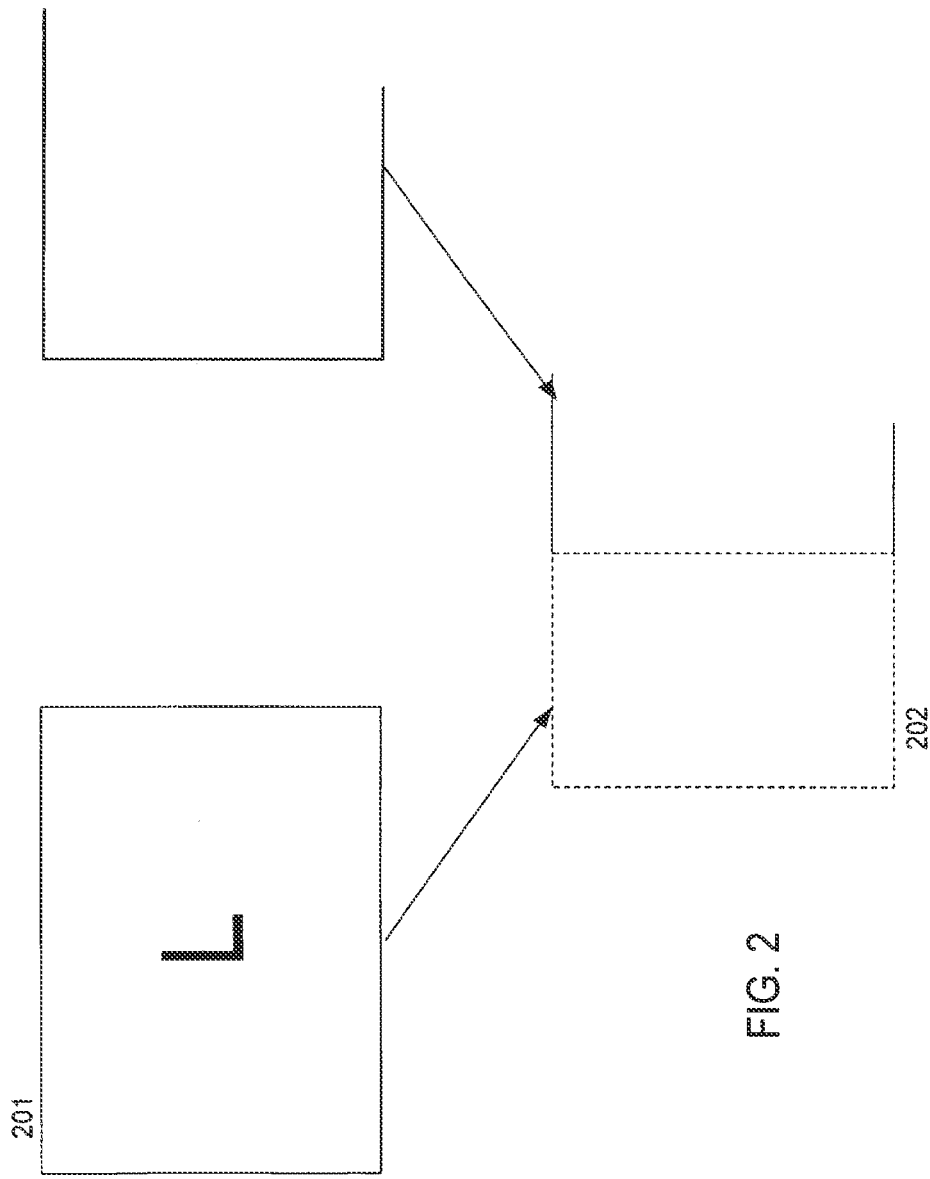
FIG. 2 shows each stereo source image component fitting in a sub-region of the destination frame, as specified by the precursor format.

FIG. 2 illustrates the concept of "precursor format," the general layout of left-eye and right-eye image data fields within the overall available image frame. The simplest precursor format separates the image frame into left and right halves, reserving each of those halves for storing image information from either of the two respective eye views. From FIG. 2, if the image frame size is 1920 pixels horizontally and 1080 pixels vertically, one might allocate the left half 202 of the frame (960×1080 pixels) to the left-eye view 201, and the right half to the right-eye view.

Thus, multiplexing two full-sized stereo pair elements to this particular precursor format becomes a problem of mapping one full-sized image to a half-sized image field, and doing so twice per stereo pair.

Figure 3:
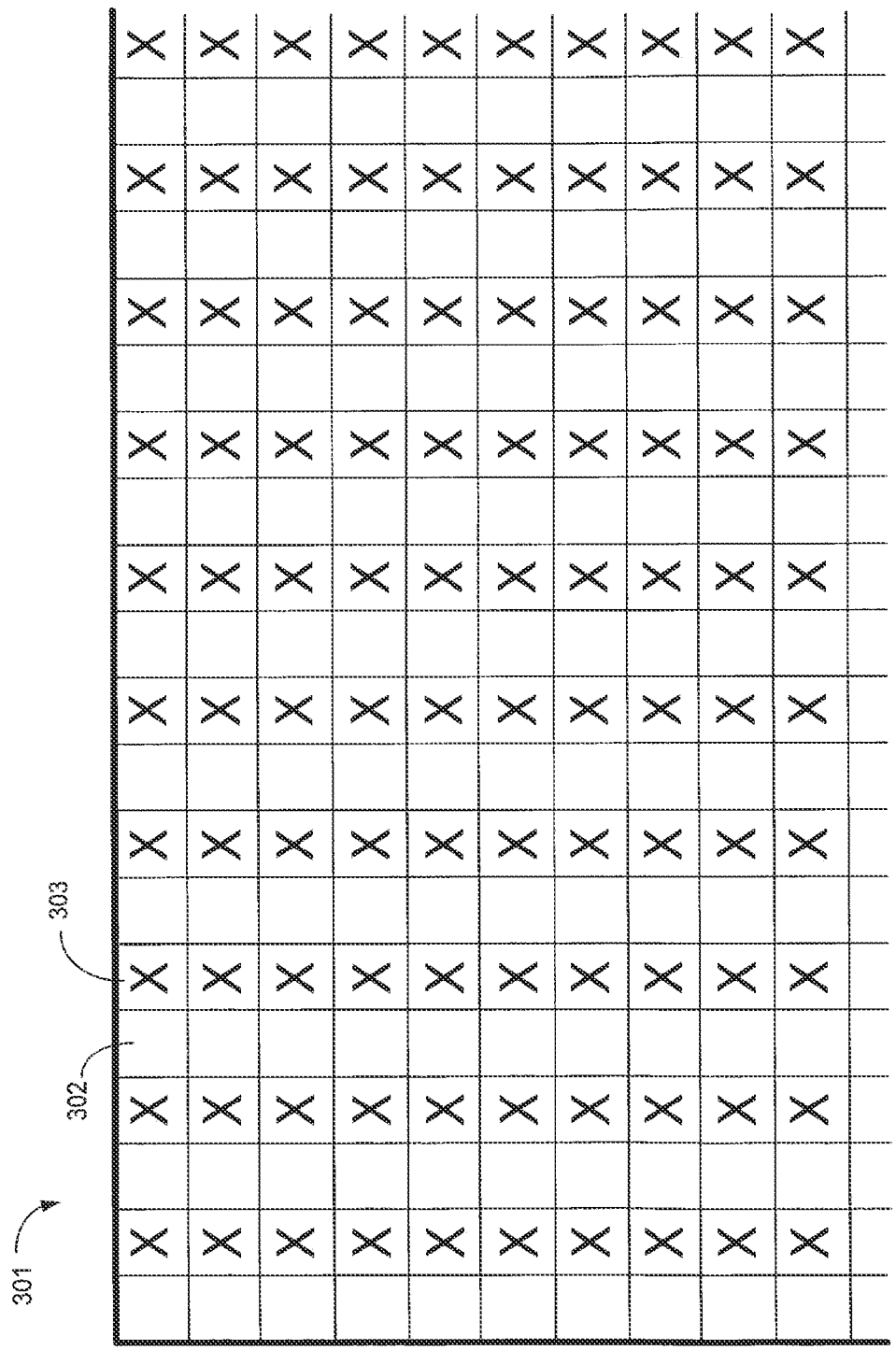
FIG. 3 demonstrates simple pixel selection, where alternating pixels are accepted or discarded.

Perhaps the simplest way to map a full-sized image to a half-sized field is to remove every other pixel from each row. For example, as shown in FIG. 3, transferring, from the original left-eye view 301, only pixels with even-numbered columns (such as the fifth pixel 302 in the first row, where the first column is number 0, an even numbered column) to the half-sized frame, while discarding other pixels (such as pixel 303), would be one way to do this. This general technique, picking some pixels and discarding others, is called "pixel selection," and may be successfully employed when multiplexing for the Texas Instruments so-called "checkerboard" video display. This style of multiplexing uses a side-by-side precursor format with pixel selection and an alternating-row staggering.

Figure 4:
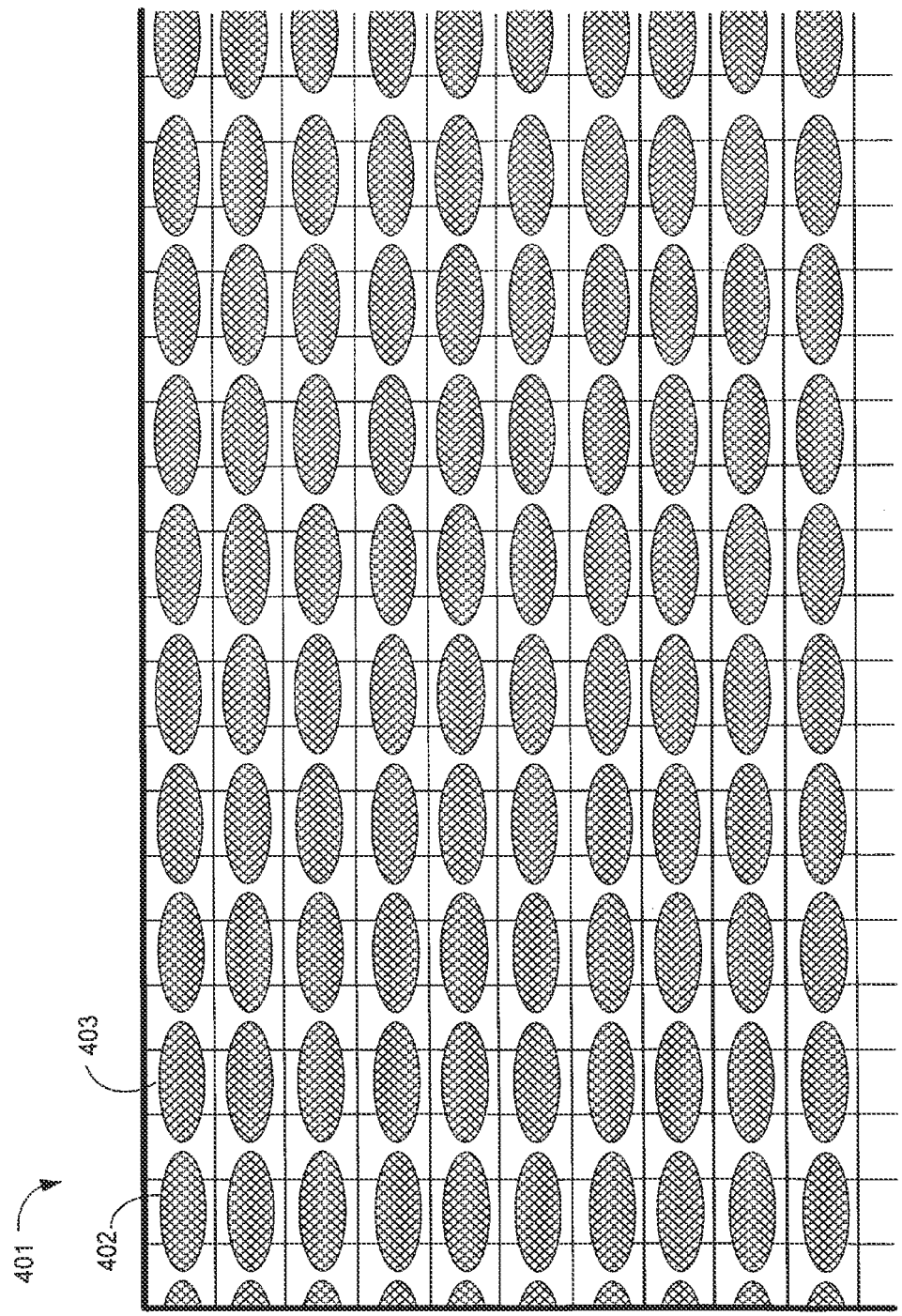
FIG. 4 illustrates filtered scaling.

The alternative to pixel selection comprises a variety of techniques generally referred to as "filtered scaling". When using filtered scaling, the pixel information mapped to the precursor field contains information derived from more than one source pixel. One example of a filtered scaling algorithm is to average two neighboring source pixels to calculate the value of any given pixel to be stored. Another algorithm might do a weighted average, where the stored pixel value primarily represents a single source pixel, whose value is also mathematically mixed with the values of neighboring pixels (along horizontal and/or vertical dimensions). The particular filtered scaling algorithm represented by FIG. 4 shows a source field 401 where resultant pixels (represented by ovals such as resultant pixels 402 and 403) draw primarily from odd-numbered columns in the source image, while also getting some pixel information from neighboring even-numbered columns. Note that a pixel with an even-numbered column (such as source pixel #2, the third pixel of the top row) contributes information to two different resultant pixels 402 and 403. There are a number of well known filtered scaling algorithms, such as linear filtering, bicubic filtering, and others, and any of these or variations thereof can be applied, including but not limited to variably applied bicubic scaling, variable sharpening, non-variably applied bicubic scaling, and non-variable sharpening.

Filtered scaling is a multiplexing technique that may most beneficially be employed for theater display. One useful filtered scaling multiplex technique uses side-by-side precursor format with variably applied bicubic scaling and variable sharpening applied after the demultiplex. Methods similar to this may also be applicable to flat-panel displays other than the TI "checkerboard" style of display.

Generally speaking, the pixel selection technique can be useful for preserving sharpness and minimizing processing overhead, while filtered scaling tends to yield smoother imagery with fewer artifacts.

Figure 5:
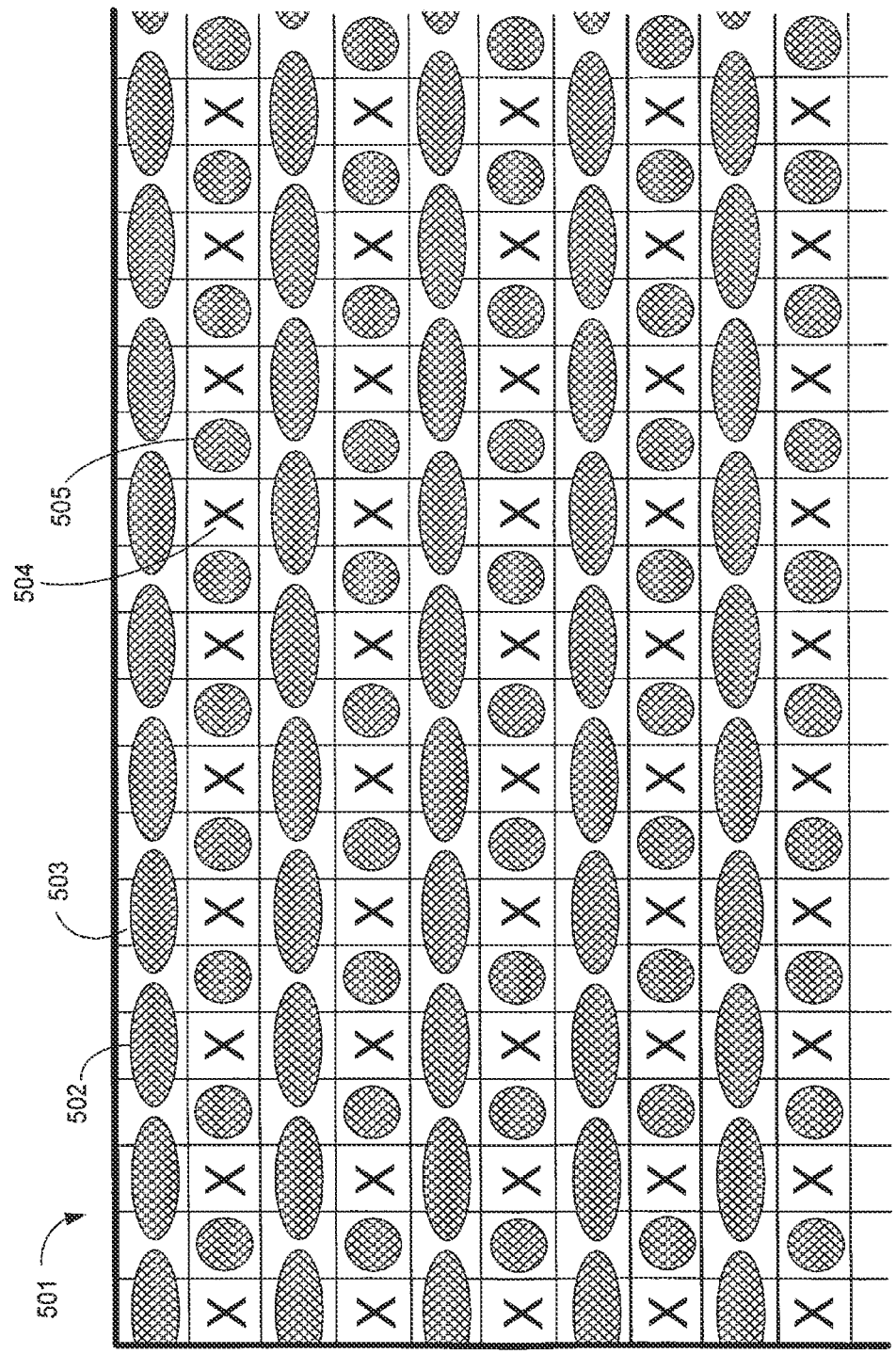
FIG. 5 shows alternating techniques being applied on alternating pixel rows, with filtered scaling appearing on the top row and every other row below it, with simple pixel selection being used on other rows.

Yet another option is called the "alternating technique," meaning to alternate the selection/scaling technique on alternating pixel rows. One example of the alternating technique is shown in FIG. 5, where simple pixel selection is employed on odd-numbered pixel rows (such as where, in left-eye field 501, pixel 504 is discarded while pixel 505 is transferred as is), while using a particular operation or filtered scaling method on even-numbered pixel rows (as where resultant pixels 502 and 503 get their information from several source pixels). This alternating technique has the potential to deliver the best of both selection and scaling; overall sharpness can be better than when using 100% filtered scaling, while the filtered scaling on alternating rows effectively reduces selection artifacts. The alternating technique can also consist of using two different types of filtered scaling on alternating pixel rows.

Figure 6:
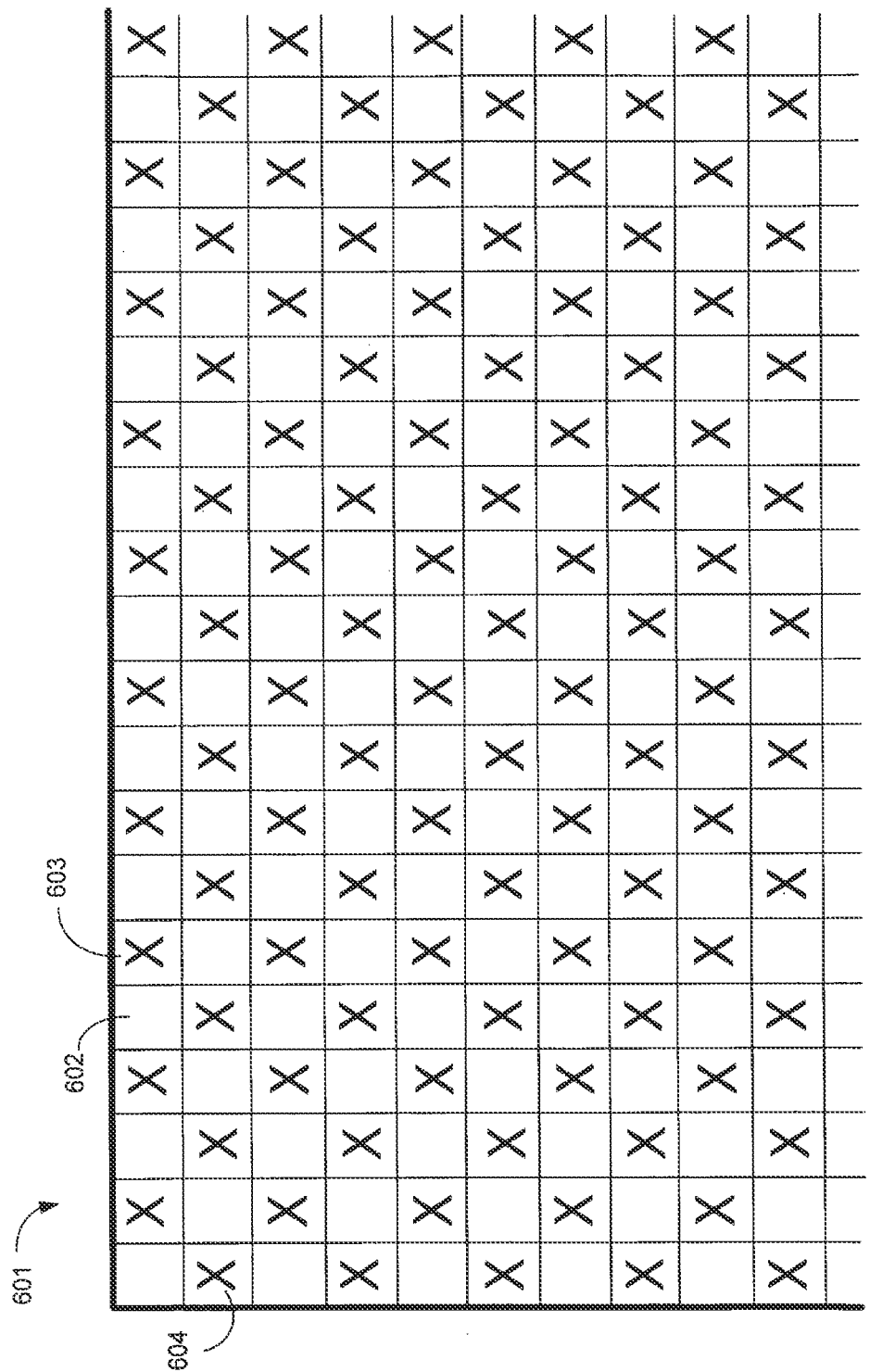
FIG. 6 demonstrates pixel selection with the staggering technique applied.

Another technique, called "staggering", can be used in combination with either pixel selection or the various filtered scaling methods (including alternating-technique methods), and can be beneficially used with the so-called "checkerboard" display manufactured and sold by Texas Instruments. With this technique, alternating rows obtain source data based on a staggered base in the source field. One example of staggering is shown in FIG. 6. A staggered pixel selection technique might choose, from a particular source image 601, even-column pixels, such as 602, from even-numbered rows (discarding odd-numbered pixels such as pixel 603), and selecting odd-column pixels from odd-numbered rows (discarding even-numbered pixels such as pixel 604). This example, combining pixel selection with staggering, actually results in a diagonal selection pattern, similar to picking only the black squares from a checkerboard. By staggering the selection in this manner, the selection becomes more effectively dimension-neutral, compared to a non-staggered column selection method, since a checkerboard texture is generally unchanged when rotated by 90 degrees.

Figure 7:
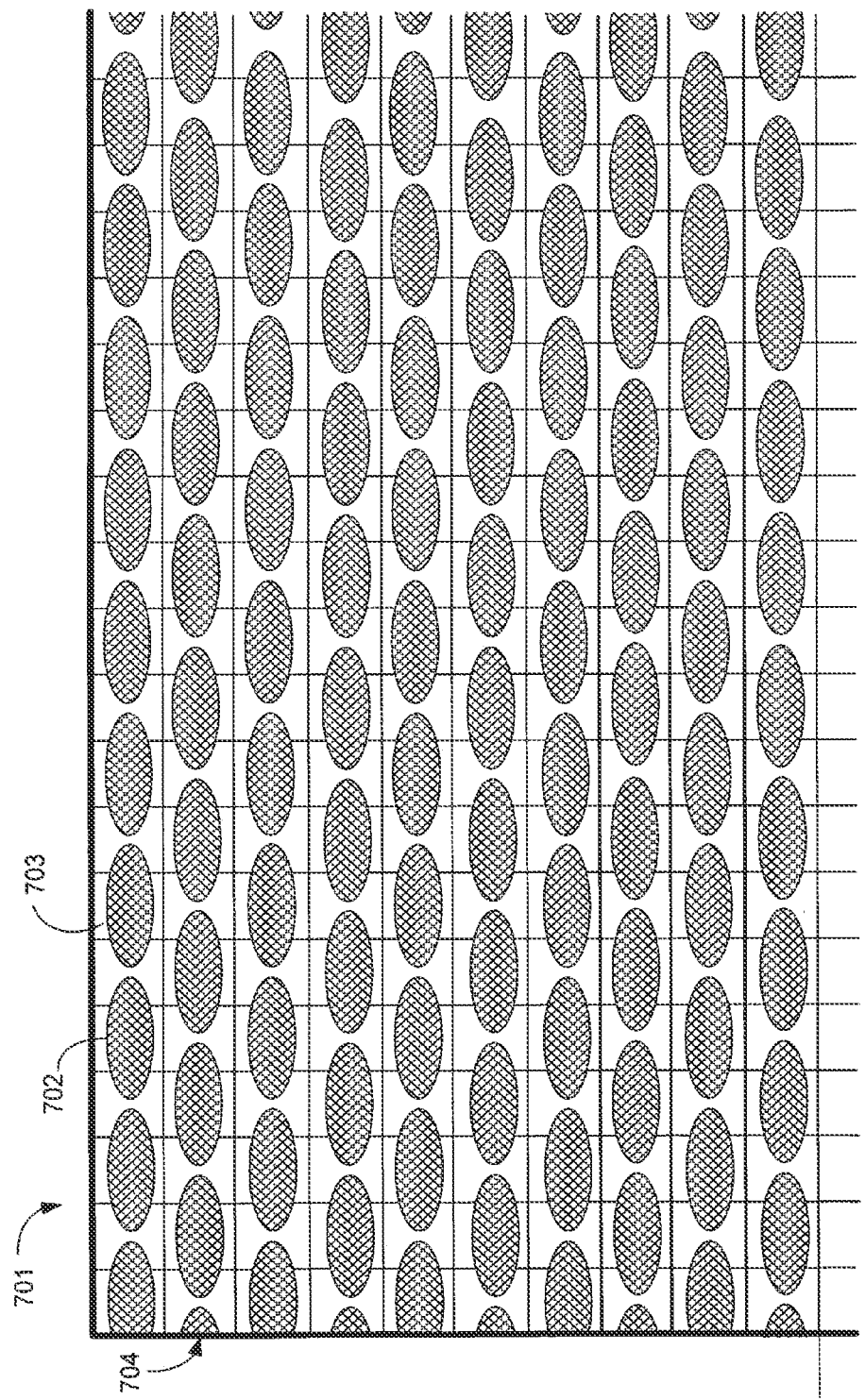
FIG. 7 shows staggering applied to a filtered scaling technique.

Staggering can be applied to any of the various filtered scaling options as well, with similar advantages compared to non-staggered filtered scaling. In the example of FIG. 7, left-eye view 701 is processed using a filtered scaling algorithm, such that resultant pixels 702 and 703 each get their information from more than one source pixel. However, while resultant pixels in the top row each draw primarily from even-numbered pixel columns (such as how resultant pixel 702 is centered, and has most of its area, over source pixel #4, and resultant pixel 703 is centered over source pixel #6), in the next row 704, resultant pixels draw primarily from odd-numbered pixel columns. Note that the first complete resultant pixel in this second row draws mainly from the second source pixel in the row, pixel #1, which is an odd-numbered pixel.

In addition to the advantage of making the selection or scaling dimension-neutral, the staggering technique has some additional advantages. Visual artifacts associated with vertical and near-vertical features are more effectively reduced. Also, some stereoscopic display systems such as the previously mentioned TI display system use a "checkerboard" or "diamond-interlace" pixel layout when in stereoscopic display mode; a staggered selection (or staggered filtered scaling) is typically more appropriate for mapping image data to such a display.

Staggering can, and generally should, be undone during demultiplexing so that the final images may be viewed without a stagger effect between alternating rows.

The stagger offset in alternating pixel rows can in certain circumstances interfere with clean image compression (or conversely, image compression algorithms might undermine the staggering). This may not be a significant problem. If staggering is being compromised, such effects can be addressed in ways discussed below.

The next technique, "variable scaling", is applicable to filtered scaling variations, but not the pixel selection technique (staggering and/or the alternating technique may be used, optionally) and may be beneficially employed in a theater environment. Variable scaling involves performing filtered scaling by varying amounts. For example, it is usually the case that the middle area the frame has scene elements that are of more critical interest than those along the edges of the frame. Thus, it can be advantageous to downscale mid-frame scene elements less, and downscale near-edge scene elements more.

Figure 8:
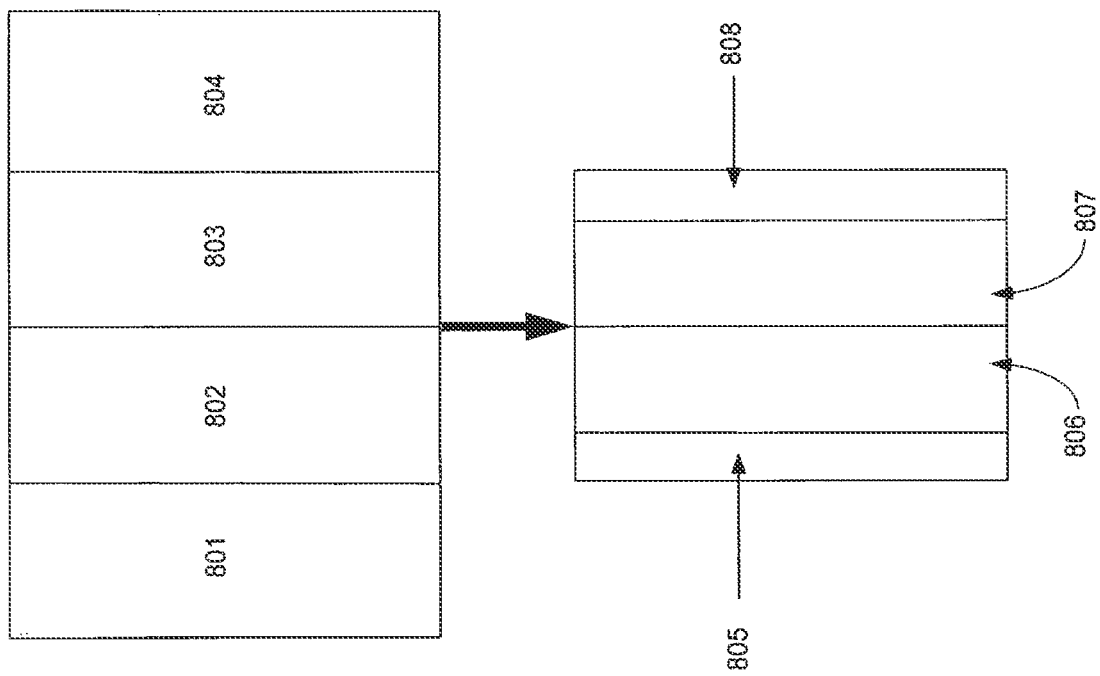
FIG. 8 shows a simple example of variable scaling, applied horizontally.

In the example shown in FIG. 8, rather than performing a horizontal-dimension scaling by 50% overall, the middle half of the frame (regions 802 and 803) can be scaled horizontally to 65% (resultant regions 806 and 807), while the quarter of the frame on the left side of the frame (801), and the quarter of the frame on the right (804), are scaled to a more drastic 35% (805 and 808). More sophisticated variations of variable scaling can be performed, such as by using a greater number of regions to be scaled by different amounts, or using a scaling method that is continuously variable. Also, techniques discussed above, such as alternating techniques and/or staggering, may be combined with variable scaling.

The end result with variable scaling is that the more important scene elements, such as mid-scene elements, having undergone less drastic scaling, remain at a higher quality with better sharpness and fewer visual artifacts. Meanwhile, less important scene elements, such as near-edge elements, have a reduction of quality, but not so drastic that a typical user would notice, given that such a user is likely to be focused more on the mid-scene areas. Again, this may be particularly useful and beneficial in stereoscopic viewing in a theater setting.

The variable scaling technique can also be applied in a scene-dependent manner, where, depending on the nature of the scene, the zones of highest quality scaling might change. For example, in a scene where the most important action is toward the left side of the frame, variable scaling can be temporarily employed to favor the left side. A technician can determine the variable scaling "recipe" of a particular scene during video editing, or the scene and appropriate scaling could be arrived at using an automatic process. For example, variable scaling may entail reserving the highest quality scaling for parts of the scene with the greatest amount of sharp-detail and/or motion. In either case, the scaling recipe can be encoded in some manner so that the frame can be demultiplexed appropriately.

Another technique that can be combined with any of the techniques mentioned so far is sharpening. Any of a number of sharpening algorithms ("unsharp mask" being an example) can be applied either during the multiplex or demultiplex stage (or perhaps both). Sharpening could, for example, restore edge sharpness to a scene that has lost some sharpness due to filtered scaling, and do so without introducing the visual artifacts that might have otherwise occurred using an inherently sharper technique such as pixel selection.

When combined with variable scaling, sharpening to a variable degree may result in a better overall picture. Parts of the scene that are scaled more drastically during the multiplex will typically require greater sharpening as well, in order to maintain a more uniform scene texture in the final result.

All of the techniques mentioned so far have been discussed with respect to a side-by-side precursor format arrangement, where full-frame left-eye and right-eye information are reduced horizontally to fit in a left-half or right-half sub-frame area. All of these techniques (in various combinations) can be applied just as well for different precursor formats, such as "above-below" (where left-eye and right-eye information need to be squashed vertically to fit in top-half or bottom-half sub-frame areas).

There are other more complicated precursor format variations possible, and all or most of the above techniques are likely to apply in such variations as well.

Figure 9:
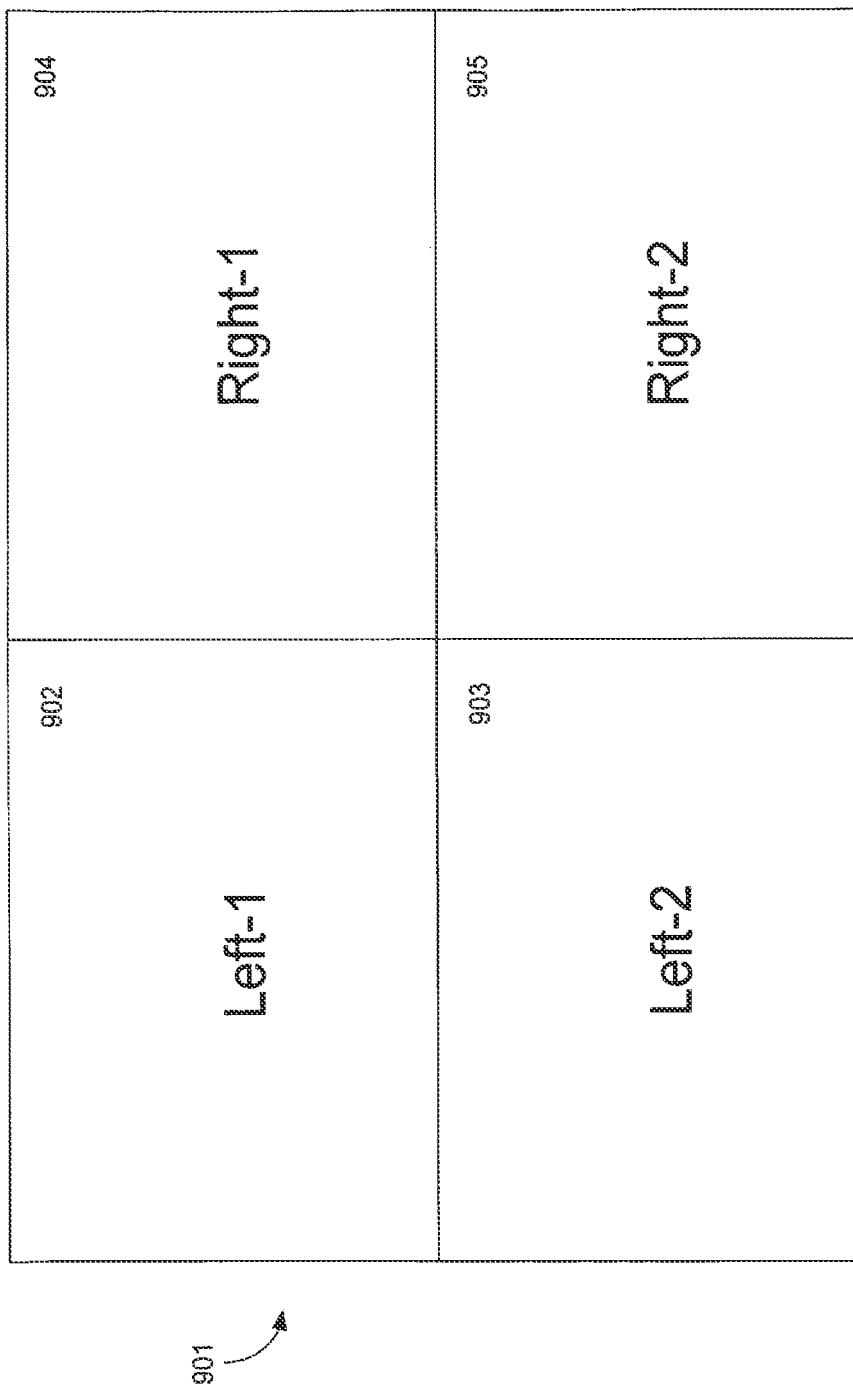
FIG. 9 illustrates an example of a four-tile precursor format.

One possible precursor format is "four-tile" such as shown in FIG. 9, where the image frame 901 is divided into four equal sized rectangular regions (for example, a 1920×1080 frame would be divided into four 960×540 regions). Two of these regions would be allocated to each eye-view (regions 902 and 903 for the left-eye view, regions 904 and 905 for the right-eye view), thus allowing two different multiplexing techniques to be used and stored separately. The demultiplex stage may subsequently combine the two source regions per eye-view, utilizing them to create a restored image that is better than if either technique was used on its own.

An example of the four-tile precursor format takes the results of staggered selection, stores the selected pixels from even-numbered rows in one left-eye-view tile, and stores the (staggered) selected pixels from odd-numbered rows in the other left-eye-view tile. By storing the staggered rows separately, the stagger effect is absent from any given tile, which can allow for cleaner image compression.

The four-tile precursor format can be useful for any kind of staggering and/or alternating technique approach, such as those discussed above. The processor simply stores the results from one technique in one tile, and the results from the other technique (and/or with staggering) in the other tile.

Furthermore, because each tile has dimensions of the same aspect ratio as the full frame, dimension-neutral scaling techniques become practical.

Figure 10:
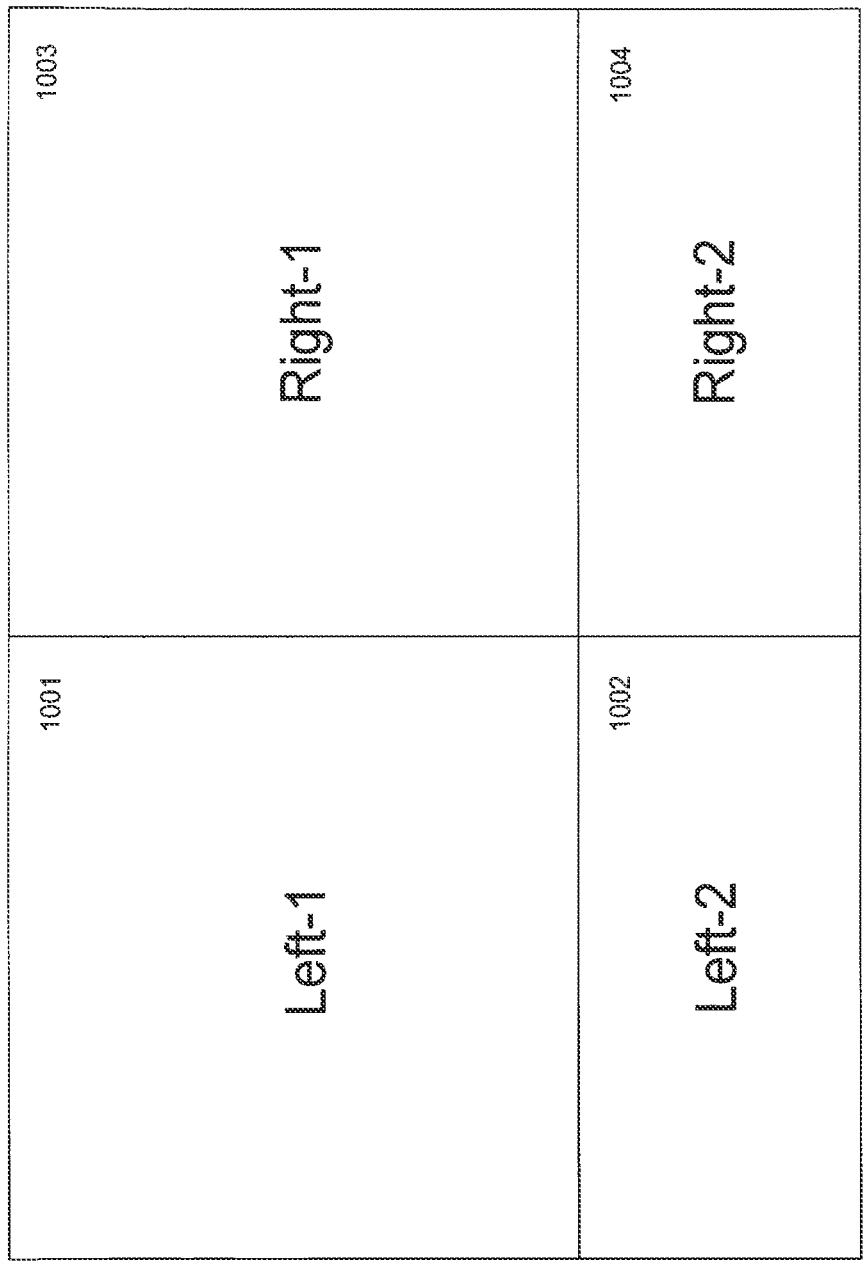
FIG. 10 is another variation of four-tile precursor format.

Another approach combines variable scaling with four-tile. Variable scaling can be applied in arriving at what each tile contains, or (in a different four-tile topology variation) the tiles themselves could be of unequal size, thus allowing one tile's combination of techniques to be emphasized. An example of this combined technique is shown in FIG. 10, where the combined techniques are done in one region at a higher quality, as shown by frames 1001 and 1003 for each respective eye-view, compared to the other tile's combination of techniques, which in FIG. 10 have frame less space allocated, shown by frames 1002 and 1004.

One of the main reasons for rearranging image data in contiguous tiles at all is because data compression is typically applied after the image frame data is multiplexed. Image and video compression algorithms rely heavily on the fact that pixels in a particular region tend to be similar to each other. Thus, the more closely precursor image fields resemble actual image data, the better they are likely to be treated by compression algorithms. Scrambling the image data too much defeats any benefits of a typical image compression algorithm.

However, if a particular compression algorithm can be relied on to respect certain boundaries, precursor formats and multiplexing technique can exploit that, gaining extra flexibility. For example, most JPEG compression algorithms work with 8×8 to 16×16 pixel blocks. Thus, the ninth pixel in a particular row should have no effect on how any of the first eight pixels in that row are compressed. Because 16×16 pixel blocks are relatively small compared to the overall video frame, using an algorithm that "stacks" 16×16 blocks allows for two-dimensional selection and/or scaling techniques that would not otherwise be appropriate for simple two-tile precursor formats such as side-by-side. Stacking in this sense means rearranging the blocks to fit within a predetermined frame, such as half of the original uncompressed image frame. In general, a process to decrease the number of pixels by removing pixels or combining pixels is performed, such as non-variable scaling, followed by rearranging the resultant blocks to fit in a desired space, such as half the original frame.

Figure 11:
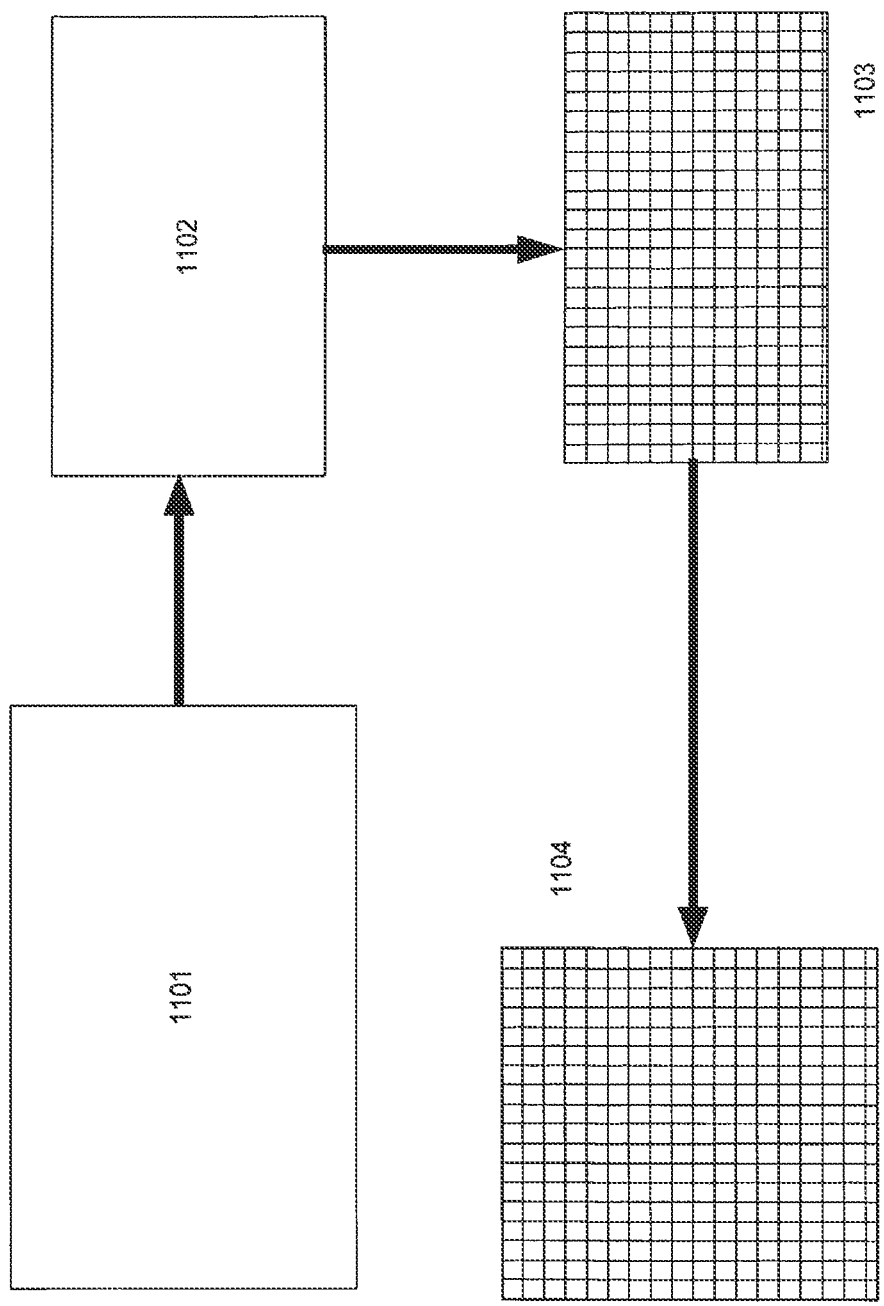
FIG. 11 shows how a stereo image component can be scaled uniformly along both dimensions and partitioned into blocks.

One example of this is shown in FIG. 11. Taking the left-eye view 1101 at 1920×1080, and applying two-dimensional bicubic scaling to 70% along each dimension yields a 1344×756 result 1102. That result can be broken up into 16×16 blocks 1103, which could be stacked into an area comprising half of the overall 1920×1080 frame 1104, freeing the other half of the frame for storing the scaled and stacked right-eye view. Alternatively, a sophisticated two-dimensional variable scaling scheme could be used. After the variable scaling, the scaled results could be stacked, then compressed. When played, the image is decompressed, and then demultiplexing un-stacks and undoes the variable scaling (optionally applying other techniques, such as sharpening). Note that sharpening is a one way technique—sharpening occurs after demultiplexing to sharpen the resultant image(s), and is generally not performed during multiplexing and undone during demultiplexing. Other block arrangements are possible, including some that rotate or otherwise manipulate individual blocks in a manner that can subsequently be undone during demultiplexing.

Customized compression schemes can be employed that are specifically designed to work with particular precursor formats, stacking arrangements, image tile topologies, and scaling algorithms.

Figure 12:
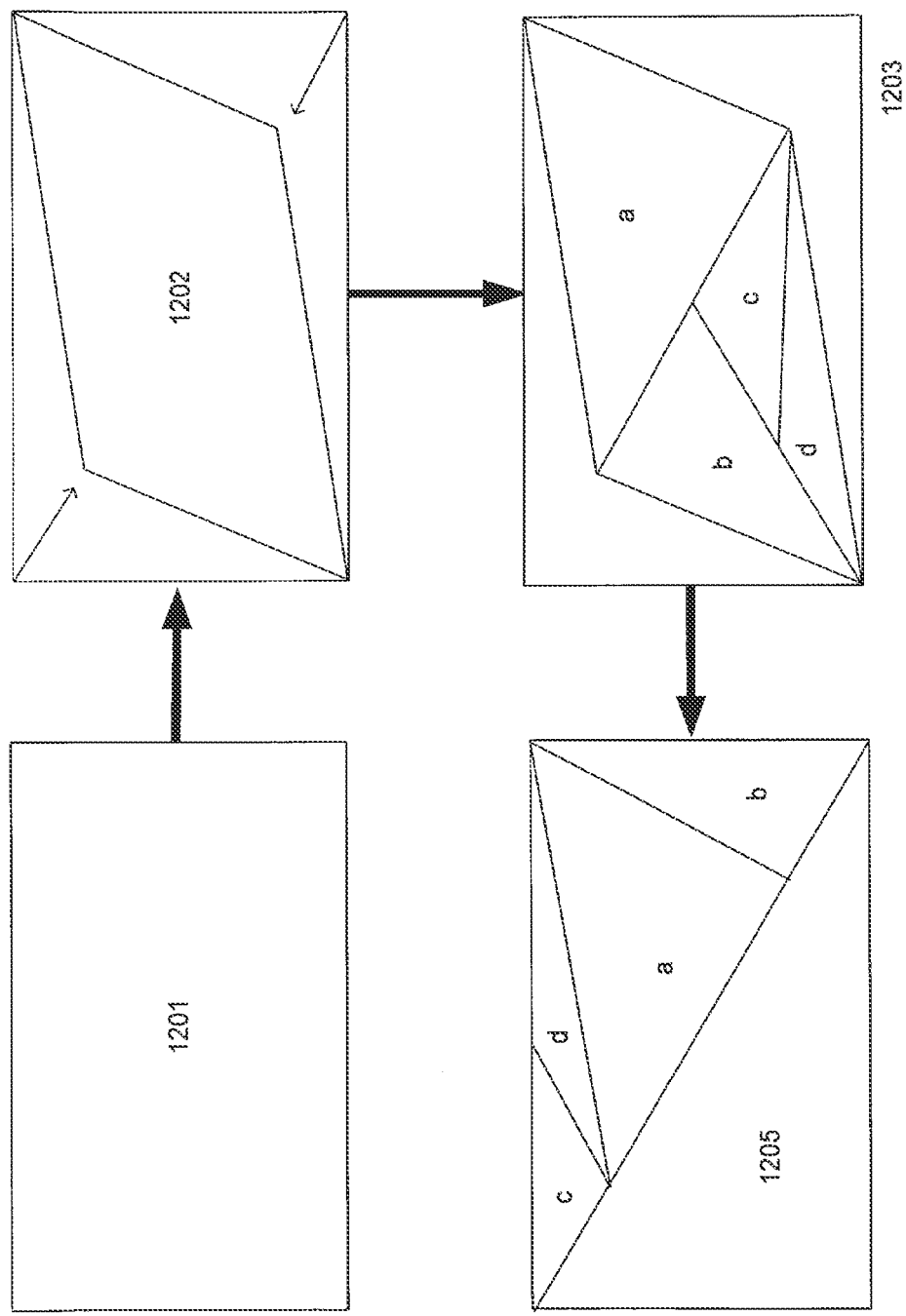
FIG. 12 illustrates one possible non-rectangular precursor format and partitioning arrangement using a parallelogram divided into subregions.

Precursor formats and tile topologies need not be rectangular. For example, as shown in FIG. 12, it might be advantageous to take each eye-view frame 1201 and apply a generally diagonal scaling, most likely done using some variation of filtered pixel mapping, such that the originally rectangular region is diagonally compressed into a parallelogram 1202. Triangular sub-regions 1203 of this parallelogram can then be rearranged to fit a precursor format 1204 such that left-eye and right-eye data are in triangular zones separated by the full frame's diagonal line. As a result, region 1205 becomes available for the other eye-view. Such a triangle-based precursor format, including smaller triangle tiling, requires a customized compression scheme that respects the unconventional tile boundaries. Another approach would be to use a diagonal morph to scale the source image to fit the triangular region of such a triangle-based precursor format, allowing it to work effectively with a standard compression algorithm.

Such a novel precursor format still allows various combinations of most of the same technique combinations discussed earlier, the same techniques that work with the simpler rectangular two-field side-by-side precursor format.

Demultiplexing the Multiplexed Data

For purposes of definition consistency, any given frame of the multiplexed source data referred to herein and received from the stereoplexing discussed above refers to both left- and right-eye stereo pair elements, encoded to fit in a single frame. Typically, the single frame of multiplexed data has pixel dimensions that are the same (or similar) size as each left- or right-eye stereo pair element. Each stereo pair element is generally encoded in a portion of the multiplexed frame that is either exactly or approximately half the size that each stereo pair element is after being demultiplexed. For example, if a storage and display can address images having 1920×1080 pixels, each left-eye and right-eye stereo pair element would be expected to be 1920×1080 pixels when demultiplexed and projected in its full size. The multiplexed frame, containing compressed versions of both stereo pair elements, would be expected to be 1920×1080 pixels.

As described above, partitioning the multiplexed frame to contain the two stereo pair elements may occur in different ways, where different partitioning arrangements are referred to as different "precursor formats." The simplest precursor format for fitting two stereo pair elements into the frame of a single image is to arrange left-eye and right-eye elements side-by-side, each element being horizontally squeezed to fit its respective space within the precursor format. For example, the stereo pair element corresponding to a left-eye view might occupy the left half of the overall frame, its full-size horizontal dimensions reduced by a factor of two in order to fit that half-frame region. The right-eye element, also compressed horizontally, would occupy the other half of the frame.

Other precursor formats are possible. A variation similar to side-by-side is above-below, where stereo pair elements have been squeezed vertically instead of horizontally and placed into respective regions, one on top of the other. Four-tile precursor formats also exist, as do non-rectangular precursor formats, and infinite other variations. While most of this discussion focuses on the side-by-side precursor format and techniques for demultiplexing image data from a multiplexed region that is half-sized horizontally from its full size, many of the techniques discussed (or variations of these techniques) are also applicable to precursor formats other than side-by-side.

In expanding a half-width multiplexed region to full-size, the simplest approach is replication, using each multiplexed pixel value twice. For example, if a particular row has 960 pixels in its multiplexed form and needs to be expanded to 1920 pixels, the system turns each pixel into two identical pixels; a red pixel followed by a yellow pixel would demultiplex into two red pixels followed by two yellow pixels.

For many applications, replication is an overly crude approach that does not provide good visual quality images. Replication can be applicable in some situations, such as when using displays that only display every other pixel on any given row or column of the demultiplexed image.

In the more common situation where the demultiplexed image is displayed at full resolution, "filtered scaling" generally yields better results than simple replication. When using filtered scaling, a pixel in the demultiplexed image obtains its information from more than one pixel of the multiplexed source. Typically, alternating pixels in the demultiplexed output uses alternating formulas when obtaining pixel data from the multiplexed source.

An example of simple filtered scaling is as follows. In this example, for any given adjacent pair of pixels in the demultiplexed output, both of the output pixels draw from a particular pair of adjacent pixels in the source multiplex. However, the two resultant output pixels use different weightings of those same source pixels. The first of those output pixels draws from the source pixels with a 3:1 weighting (mostly drawing from the first source pixel), while the second output pixel draws from the same source pixels with a 1:3 weighting (mostly drawing from the second). The next adjacent pair of demultiplexed output pixels uses the same method of different weighted averages, but draws from the second source pixel from above and the pixel following that one. In other words, the first two output pixels draw from source pixels A and B (using different weightings), the next two output pixels draws from source pixels B and C, the two output pixels after that draw from pixels C and D, and so on (where source pixels are labeled A, B, C, D, etc.). Again, drawing three parts from the first pixel and one part from the second pixel occurs for each of these adjacent pairs.

There is at least one filtered scaling demultiplexed method in which alternating output pixels use filtered scaling while other alternating pixels use simple replication. For example, even numbered output pixels replicate the original multiplexed pixels, while odd numbered output pixels are calculated as an average blend of the two received pixels that each (blank) odd numbered pixel straddles.

More sophisticated filtered scaling algorithms can give the best visual results. In many cases, each output pixel drawing from four to eight source pixels in the same row generally give improved results. Filtered scaling that draws from multiplexed source pixels in the same row and in one or more nearby rows may also work well.

One common disadvantage of some filtered scaling methods is that sharpness and/or edge quality may be reduced. Still other filtered scaling methods might give better sharpness, but might introduce undesirable artifacts. A demultiplex technique that can potentially offer some of the better aspects of two different methods uses different filtered scaling methods on alternating rows. A variation of this uses, on alternating rows, one filtered scaling method, and another method uses replication (or, uses replication in combination with filtered scaling).

Certain multiplex/stereoplex methods employ a technique called "staggering", in which there is a slight horizontal offset of original source pixel data, introduced on alternating rows. With this technique, even-numbered rows might, for example, draw from even numbered columns (or use a filtered scaling method centered over original even numbered columns), while odd-numbered rows might draw from odd numbered columns (or use an odd-column-centered scaling). In other words, in row 2, columns 0, 2, 4, etc. are employed, while in row 3, columns 1, 3, 5, etc. are employed. In the demultiplex stage, the demultiplex method applies an equal and opposite "stagger", such that all rows in the final output image would be properly aligned relative to each other. From the foregoing example, row 2 includes column 0, 2, 4, etc. data, and may be demultiplexed from these even column pixels by filtered scaling or replication, while row 3 includes pixels from column 1, 3, 5, etc. data, and may be demultiplexed from these odd column pixels by filtered scaling or replication. Staggering may be used in combination with other demultiplexing techniques discussed above.

Other pixel techniques may be applied in the multiplex stage that are undone in the demultiplex stage. For example, the multiplexing/stereoplexing stage may use a pixel rearrangement scheme that effectively shifts some of the effective resolution reduction that a side-by-side precursor format normally imposes on the horizontal dimension, such that some of the resolution reduction comes from the vertical dimension. In using such a scheme during multiplexing/stereoplexing, the scheme is reversed during the demultiplex stage.

One technique that can be used to improve the effective quality of a multiplexed image is variable scaling, in which more important identified regions of the image (such as the central portions of the image, or particular sections chosen based on other factors) are downscaled less than other regions of the image. During demultiplex, the reverse scaling is also variably applied, such that the final output image is of proper proportions throughout.

Sharpening is a useful technique for improving image quality during the demultiplex stage. Most filtered scaling operations reduce perceived sharpness of the image and its features. By adding a sharpening filter to the demultiplex operation, or by integrating effective sharpening into the filtered scaling function itself, the reduction of sharpness can be effectively counteracted, yielding an output image that has perceived texture quality similar to the original image. When used with a side-by-side precursor format and horizontal-axis scaling, a sharpening filter may be employed that only works horizontally. Alternately, some variation of a two-dimensional sharpening filter may be employed, sharpening on one dimension (horizontally) and separately or jointly sharpening the second dimension (vertically). Sharpening can generally be used in combination with any of the demultiplex techniques mentioned herein.

If the variable scaling technique is used in the demultiplexing phase, variable sharpening can also be employed successfully. Greater amounts of scaling will usually call for greater amounts of sharpening. Using selected amounts of sharpening in different regions of the image can help make the overall image of uniform sharpness, the improving the overall image quality.

As noted, precursor formats other than side-by-side are possible, such as above-below, four-tile, and various other arrangements. Many of the techniques described with respect to the side-by-side precursor format may also apply, with some variations, to other precursor formats.

With the four-tile precursor format, the four tiles can be used in various ways. One possible use of four-tile is to separate out alternating rows obtained from a multiplex scheme that includes a horizontal offset between alternating rows, providing separate tiles without the alternating row offset that would be present if alternating rows were not separated out. When demultiplexing this kind of four-tile arrangement, or any other kind of four-tile arrangement, the system essentially undoes whatever rearrangement was done during the multiplexing operation.

Most of the multiplexing and demultiplexing methods described so far are generally applicable regardless of the particular format used in encoding pixel color information. For example, virtually all of the above techniques are applicable to RGB color data and are also applicable to imagery encoded in a YUV format. Some format variants have particular attributes that may be considered when optimizing the multiplex and demultiplex functions. For example, some types of YUV transmissions (such as the YUV 4:2:2 format, known to those skilled in the art) offer lower storage or transmission bandwidth to the U (also called Cb) and V (Cr) components than to the Y component, and therefore techniques may be called for in multiplexing and demultiplexing that would not be called for with a different pixel storage format. With YUV 4:2:2, for example, the system may beneficially combine the side-by-side precursor format with a pixel component rearrangement scheme such that the scaling dimension (horizontal) is perpendicular to the dimension of the effective resolution reduction of chroma components Cb and Cr due to 4:2:2 sampling. In such a design, pixel components are rearranged such that only vertical resolution is sacrificed by Cb and Cr sampling.

Multiplexing and demultiplexing in this manner is particularly suited for applications in which the intermediate image storage or transmission format uses YUV image encoding, and where the U (also sometimes referred to Cr or pR) and V (Cb or pB) components are at half-resolution horizontally.

To explain a bit further, with YUV 4:2:2, a 1600×1200 image is stored with 1600 Y data points per row, but only 800 U and 800 V data points per row. Performing stereoscopic multiplexing with a side-by-side precursor format results in a 1:2 reduction of horizontal scale for each stereo pair element (or reductions of scale that average 1:2, if using variable scaling). Using an intermediate stage image format that stores some component data (U and V in this instance) at half horizontal resolution, the result is that, for those pixel components, horizontal resolution is reduced to ¼ of original, which is generally visually unacceptable.

One way around this visual appearance issue is to use an above-below precursor format instead of side-by-side. In above-below precursor format, scaling is along the vertical axis while YUV pixel component sampling is done along the horizontal axis. This tends to better spread out, rather than compounding, pixel component resolution issues, and image quality typically improves. However, with an above-below precursor format, the hardware implementation typically requires an image storage buffer larger than half the size of the intermediate image, which adds expense and complexity to the system.

Figure 13A:
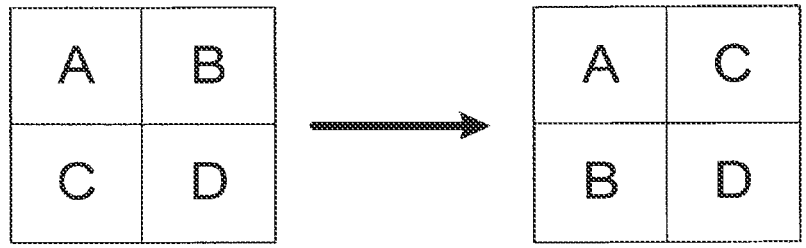
FIGS. 13a and 13b show two variations of a four pixel arrangement and pixel rearrangement in accordance with one aspect of the present design.
Figure 13B:
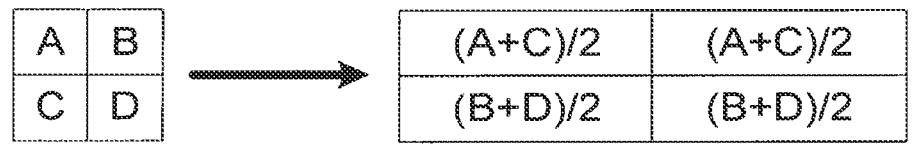

The present design rearranges, and optionally averages, pixel component data (only the components that the intermediate format will reduce horizontal resolution of) during the multiplexing/stereoplexing as shown in the examples of FIGS. 13*a* and 13*b*. These arrangements and processing have the effect of switching the resolution reduction from horizontal to vertical, as pixel components that had been aligned horizontally (A and B in FIG. 13*a* and FIG. 13*b*) are employed in vertically adjacent pixels.

At some point during the multiplex, ideally following the horizontal compression to fit the side-by-side precursor format (though that ordering could be switched with some modification to the rearrangement scheme), pixels are rearranged such that pixel components that were originally horizontally adjacent become vertically adjacent. An example of such a pixel rearrangement is shown in FIG. 13*a*. In this example, pixel components are simply remapped. For any given 2×2 block of pixels, each of the chroma components are rearranged per the scheme shown. Pixel Component B, originally to the right of Component A, is moved so that it is immediately below Component A, while Component C, originally to the left of Component D, is moved to be just above Component D. Subsequent component sampling will remove components from one of these columns (let's assume the second column), leaving only Component A and the recently relocated Component B. In such a manner, the two pixel components that were originally horizontally adjacent survive the component sampling stage; Components C and D are lost, and thus the sampling stage has sacrificed vertical rather than horizontal chroma component resolution.

FIG. 13b shows a somewhat better variation of this multiplexing technique. In FIG. 13b, within any given 2×2 block, pixel components that were originally vertical neighbors are still moved to become horizontal neighbors, but they are also averaged with each other using the scheme shown in FIG. 13b. This averaging effectively blends pixel components that were originally vertically adjacent, so that both of them will still be represented following the component sampling stage. Notice that horizontally adjacent pixel pairs have identical values after the rearrangement, so it does not matter which of them is selected or discarded by component sampling. The end result is that the first column's original pixel component data (A and C, averaged together vertically) is stored separate from the second column's original pixel component data (B and D, averaged together vertically), in successive rows; thus, horizontal component resolution is preserved by shifting it into the vertical dimension.

This rearrangement is undone at the start of demultiplexing, restoring horizontal resolution to what it was before the original rearrangement and subsequent conversion to a reduced-horizontal-resolution intermediate format. Pixel components that the intermediate format does not reduce in resolution (namely, the Y component of YUV) remain in place, neither averaged nor rearranged.

Figure 14A:
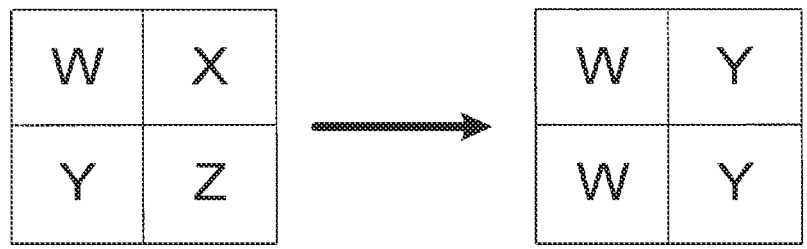
FIGS. 14a and 14b show two variations of a four pixel arrangement and pixel rearrangement that is the inverse technique of the operation shown in FIG. 13.
Figure 14B:
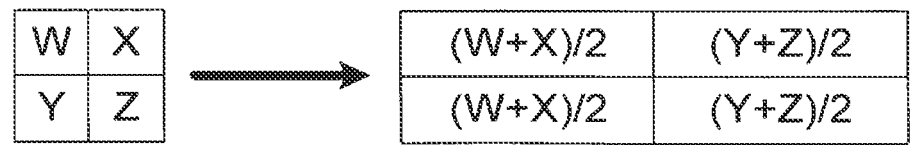

FIGS. 14a and 14b show two variations of demultiplexing techniques that undo the pixel rearrangement techniques such as those shown in FIGS. 13a and 13b. For any given 2×2 pixel block that has just been decoded from its storage or transmission encoding, the particular pixel components that had been rearranged during multiplexing per the type of technique illustrated by FIGS. 13a and 13b need to again be rearranged to approximately restore the original pixel arrangement. This rearrangement would ideally be done at the start of demultiplexing, before decompressing each half-width stereo pair element to its full size, but a similar pixel rearrangement technique may be applied following the horizontal decompression and achieve similar results.

FIG. 14a shows a simple example of performing this rearrangement that occurs during demultiplexing. Here, Pixel Components X and Z are discarded, Component Y is moved from being vertically adjacent to Component W to being horizontally adjacent to Component W, and then both Components W and Y are replicated on the following row. At the start of demultiplexing, the pixel map has been reconstructed from YUV 4:2:2, meaning that horizontally adjacent pixel components in any given 2×2 block, having been represented by a single number due to horizontal sampling, should be nearly identical, and therefore very little useful information is lost by discarding Components X and Z. In fact, these horizontally adjacent pixel components are typically not quite identical, due to techniques used in decoding the pixel map, and therefore, an averaging scheme may be employed in combination with the pixel rearrangement as shown in FIG. 14b. In FIG. 14b, the very similar but not quite identical horizontally adjacent pixel component pairs, W and X, and also Y and Z, are averaged with each other, and these averages are transposed such that the horizontal-vertical pixel component rearrangement technique performed during multiplexing is effectively undone.

The combining technique of FIGS. 13a and 13b and resultant decompression from (A+C)/2 in horizontally adjacent pixels to vertical approximations, typically allows horizontal scaling of stereo pair elements fitting the side-by-side precursor format, while effectively shifting further resolution reduction of certain pixel components, due to constraints of the intermediate image format, into the vertical axis. The result is improved image quality as compared to having both resolution reductions being done horizontally. There is the added benefit that the need for processing memory is limited to a modest amount, typically two pixel rows at a time.

Example Multiplexing and Demultiplexing Algorithms

A demultiplexing algorithm according to the present design may operate as follows, where variations of the algorithm may be provided that are still within the course and scope of the present design. In the algorithm there is a stereo pair of images, each image of which is of pixel resolution (w, h). The stereo pair is multiplexed into a single frame of the same size, (w, h). The stereo pair is subsequently demultiplexed so that each element is of its original pixel resolution, and is displayed at that resolution. Multiplexing and demultiplexing acts on images that are encoded in any format, but for purposes of this discussion YUV format is employed. In between multiplex and demultiplex operations, sampling occurs such that the Cb and Cr component values in odd numbered pixel columns (of the multiplexed frame) are ignored. The side-by-side "precursor format" is employed.

Horizontal-only filtered scaling operations are performed on both multiplex/stereoplex and on demultiplex. For any given output pixel, the algorithm processes or "looks at" six (multiplex) or four (demultiplex) pixels from different columns belonging to two input rows. All calculations are sums of two-term multiplication operations. On demultiplex, the system uses two different formulas, one for even output rows and the other for odd output rows.

In preparation for YUV sampling, the multiplex algorithm has an additional step where Cb and Cr pixel components belonging to pairs of adjacent pixels are averaged with each other and locally rearranged. Such processing may be implemented as a separate step, or integrated with the filtered scaling calculation. Some local rearrangement can precede the demultiplex operation, and the demultiplex algorithm may incorporate a sharpening filter.

The "precursor format" of the multiplex is side-by-side, discussed above, where the left-eye stereo pair element is generally compressed horizontally and stored in the left half of the multiplexed frame, while the right-eye element is compressed horizontally and stored in the right half of the multiplexed frame.

Compressing horizontally means that twice as many input columns of data will exist as output columns, for either of the two stereo pair elements. If the original pixel width is w, the multiplexed pixel width, for each stereo pair element, is w/2.

More specifically, each output (multiplexed) pixel column draws from six input (original) pixel columns. For any given output pixel (x, y), the system uses input pixels (2x−2, y) through (2x+3, y). The formula is as follows:

$$\text{mux}(x,y) = -0.05 * \text{in}(2x-2,y) + 0.10 * \text{in}(2x-1,y) + 0.45 * \text{in}(2x,y) + 0.45 * \text{in}(2x+1,y) + 0.10 * \text{in}(2x+2,y) - 0.05 * \text{in}(2x+3,y) \quad (1)$$

where in(A,B) represents input pixel in column A and row B. The first and last terms of Equation (1) are of small magnitude. For better efficiency, Equation (1) may be slightly modified to eliminate these terms, using four input columns instead of six. In fact, the very simple two-column formula that follows may provide satisfactory (but slightly inferior) results:

$$\text{mux}(x,y)=0.5*\text{in}(2x,y)+0.5*\text{in}(2x+1,y) \qquad (2)$$

Also, the six input formula of Equation (1) needs to allow for the possibility that the output pixel component's calculated value will be out of its acceptable range. The system may need to assign a minimum value if the calculated value is too low, and a maximum value if the calculated value is too high. The algorithm may consider boundary issues, as some columns near the left and right edges may not have the ability to obtain some column information that would be outside the bounds of the input bitmap.

In general, the constants used in Equations (1) and (2) and in subsequent Equations may be employed, but may be altered depending on circumstances, including but not limited to the images or stereo pair employed, processing capabilities, appearance of the moving image, or desires of the designer or viewer. Larger, smaller, or entirely different coefficients may be employed.

The multiplex calculation is typically performed for all three components of every pixel. If the input is in 4:2:2 format (Cb and Cr components are only available for every other pixel column), every adjoining pair of input pixels has identical Cb and Cr values, or nearly identical if there has been some decompression processing in presenting 4:2:2 encoded information. However, the multiplexed result has distinct values for all three components of each pixel, and these distinct values are needed in the next stage calculation. Cb and Cr sampling occurs thereafter, and the system then reverts the data to a 4:2:2 stream.

Due to the Cb and Cr sampling that takes place after the multiplex, the system may apply, during the multiplex, a rearrangement scheme to Cb and Cr components, optionally accompanied by an averaging of pixel components that are horizontally adjacent after the rearrangement. During demultiplex, after pixel map decompression but before restoring left- and right-eye stereo pair elements from the precursor format to full size, the pixel rearrangement scheme used during multiplexing needs to be undone, using an inverse pixel component rearrangement scheme, as shown in FIG. 14b. Equations (3) through (8) demonstrate one way to implement this technique. In these equations, the first column is numbered 0, and is thus even:

$$\text{mux}Cb(\text{even } x, \text{even } y)=\text{average}(\text{mux}Cb(\text{even } x, \text{even } y), \text{mux}Cb(\text{even } x+1, \text{even } y)) \qquad (3)$$

where muxCb represents the multiplexed value for any given Cb component with even row and column numbers, even x is the even first (row) value, even y the even second (column) value, and average represents an averaging function. In Equation (3), muxCb(0,0), muxCb(0,2), muxCb(0,4) . . . muxCb(2,0), muxCb(2,2), muxCb(2,4) . . . and so forth are computed.

$$\text{mux}Cb(\text{even } x+1, \text{even } y)=\text{mux}Cb(\text{even } x+1, \text{even } y+1)=\text{average}(\text{mux}Cb(\text{even } x, \text{even } y+1), \text{mux}Cb(\text{even } x+1, \text{even } y+1)) \qquad (4)$$

$$\text{mux}Cb(\text{even } x, \text{even } y+1)=\text{mux}Cb(\text{even } x, \text{even } y) \qquad (5)$$

$$\text{mux}Cr(\text{even } x, \text{even } y)=\text{average}(\text{mux}Cr(\text{even } x, \text{even } y), \text{mux}Cr(\text{even } x+1, \text{even } y)) \qquad (6)$$

$$\text{mux}Cr(\text{even } x+1, \text{even } y)=\text{mux}Cr(\text{even } x+1, \text{even } y+1)=\text{average}(\text{mux}Cr(\text{even } x, \text{even } y+1), \text{mux}Cr(\text{even } x+1, \text{even } y+1)) \qquad (7)$$

$$\text{mux}Cr(\text{even } x, \text{even } y+1)=\text{mux}Cr(\text{even } x, \text{even } y) \qquad (8)$$

Equations (3) through (5), and Equations (6) through (8), are performed in the specified order, as some equation results replace values that are used in some of the same Equations.

Equations (3) through (8) can be illustrated graphically as shown in FIG. 14b. In FIG. 14b, a top-down row numbering convention is used. FIG. 14b shows that, for any given 2×2 grouping of pixels (four pixels total where the first pixel in the grouping is both even row and even column), the system averages decompressed (but pre-demultiplexed) pixel components horizontally, and puts one average on the first column and the other average on the second column. Rather than performing the above Cb and Cr component averaging and rearranging as a second step, the operations of Equations (3) through (8) could instead be integrated with the mux(x,y) multiplex calculation.

The demultiplex stage performs a horizontal-axis expansion scaling; where the pre-demultiplex pixel width is w/2, the post-demultiplex pixel width is w. Just before performing demultiplexing, the system performs an averaging and rearranging of the pixels' Cb and Cr components, as described above. This averaging and rearranging is the inverse of the averaging and rearranging performed at the end of the multiplex, and yields an imperfect averaged value, but is better than simply replicating one row and removing that row during demultiplexing. Again, the process for multiplex-stage rearranging from horizontal to vertical is shown graphically in FIG. 13b, and the demultiplex-stage rearranging is shown graphically in FIG. 14b. For any given 2×2 grouping of pixels (four pixels total, where the first pixel in the grouping is both even row and even column), FIGS. 13b and 14b employ a top-down row numbering convention. In FIG. 14b, pixel components W and X may be identical to each other, as would pixel components Y and Z, if no compression takes place between the multiplex and demultiplex, and/or if Cb and Cr data only arrives at half-resolution. In this case, averaging is not necessary. In some implementations, W may be different from X, and Y different from Z. If such differences exist, data is averaged.

Formulas in Equations (3) through (8) remove the data from 4:2:2 formatting. The resulting pixel components are distinct values for each of the three components of each pixel, and these distinct values are employed in the next stage of demultiplexing.

The main demultiplexing function is a separate operation from the above averaging and rearranging, though the two processes may be integrated.

Each output (post-demultiplex) column draws from four input (pre-demultiplex) columns. For any given even-column (the first column is numbered 0) output pixel (x, y), the algorithm uses input pixels (x/2−2, y) through (x/2+1, y). For any given odd-column output pixel (x, y), the algorithm uses input pixels ((x−1)/2−1, y) through ((x−1)/2+2, y). The formulas employed are as follows.

For even-numbered columns (including the first column, numbered 0):

$$\text{demux}(x,y)=-0.0432*\text{in}(x/2-2, y)+0.2311*\text{in}(x/2-1, y)+0.9951*\text{in}(x/2, y)-0.1830*\text{in}(x/2+1, y) \qquad (9)$$

For odd-numbered columns:

$$\text{demux}(x,y)=-0.1830*\text{in}((x-1)/2-1, y)+0.9951*\text{in}((x-1)/2, y)+0.2311*\text{in}((x-1)/2+1, y)-0.0432*\text{in}((x-1)/2+2, y) \qquad (10)$$

As with the multiplexing/stereoplexing, the calculated output pixel component value may be out of an acceptable range. A too-low value is assigned the minimum value, and a too-high value is assigned the maximum value. Also, boundary bitmap issues may exist. The left-most and right-most two output columns typically will miss some input columns, and the calculation may need to be adjusted for those columns.

Overall quality tends to be affected more by minor changes to the demultiplexing calculations than minor multiplexing/stereoplexing changes. Thus, while a simpler multiplex calculation (using fewer input columns) may work roughly as well as a more complex calculation, such a proposition is less true for the demultiplex calculation.

The demultiplex formulas above include a moderate sharpening filter that can improve the look of the image. The multiplex/demultiplex process tends to soften the image, and a sharpening filter helps to counteract that effect. For a no-sharpening version of Equations (9) and (10), the values employed may be—0.0357 in place of −0.0432, 0.2625 for 0.2311, 0.8795 for 0.9951, and −0.1063 for −0.1830.

Alternately, a variable scaling algorithm may be employed, in which the vertical compression is more extreme near the edges and higher quality near mid-scene. This may in many cases improve the overall perceived quality of the image. A similar calculation may be employed:

$$result = n1 \cdot in(xIn-3, y) + n2 \cdot in(xIn-2, y) + n3 \cdot in(xIn-1, y) + n4 \cdot in(xIn, y) + n5 \cdot in(xIn+1, y) + n6 \cdot in(xIn+2, y) + n7 \cdot in(xIn+3, y) + n8 \cdot in(xIn+4, y) \quad (11)$$

Where result represents the value accorded to a pixel x,y, with n[x] representing coefficients and In representing the input pixel(s) received.

The calculations or, more specifically, the multiplicative factors used in Equation (11), n1 through n8, may change on a per-row basis. Such an implementation generally employs scaling values for different parts of the original frame range. Scaling factors or multiplicative factors may be optimized, and scaling may be performed with no resulting fractional-pixel offset effect. Different amounts of variable sharpening may be included in the demultiplex depending on circumstances.

Figure 15:
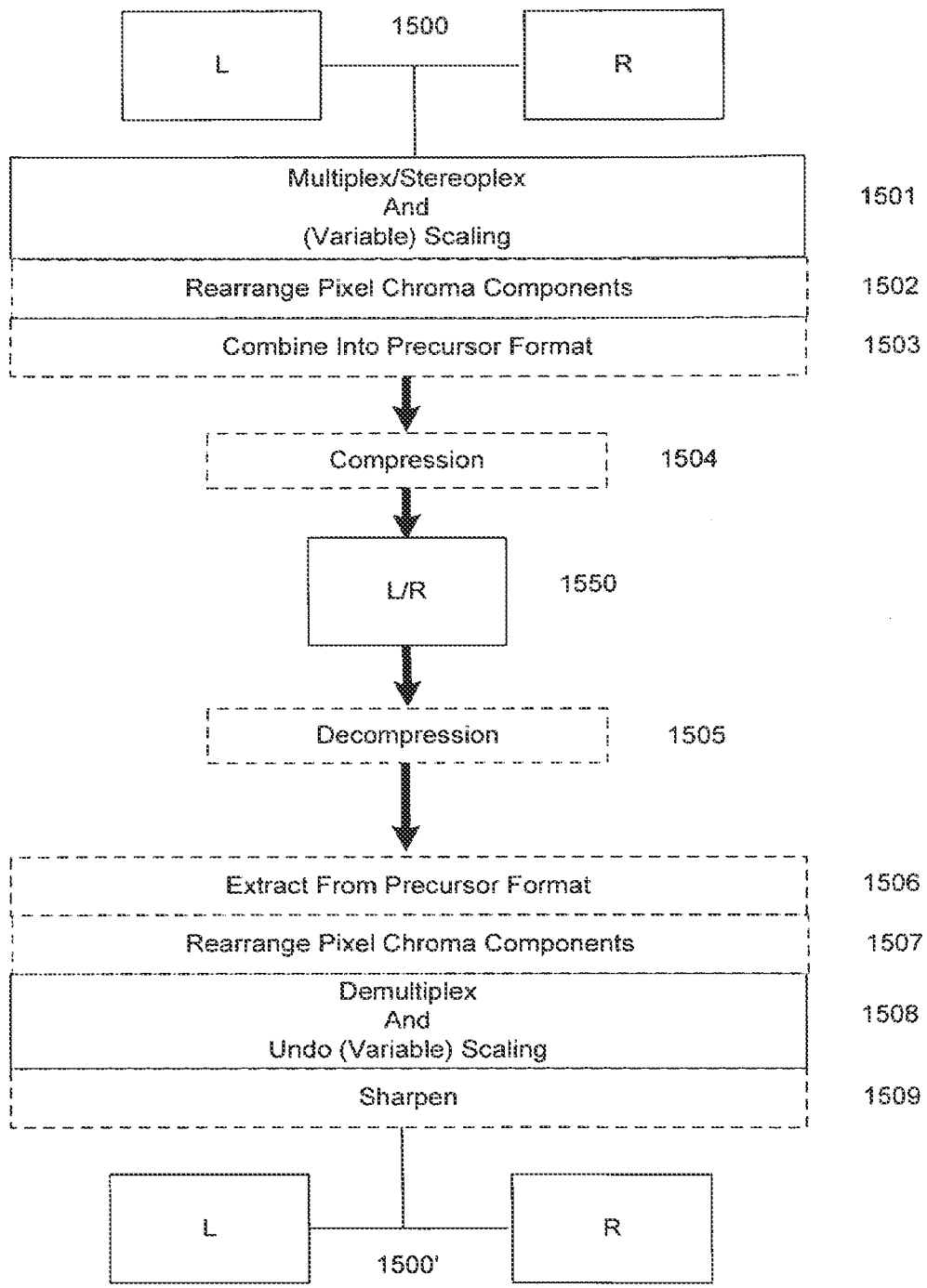
FIG. 15 illustrates general operation of the present design.

A general overview of the present design is presented in FIG. 15. From FIG. 15, the stereo pair 1500 is multiplexed and variably scaled as desired at point 1501, such as in a side-by-side or above-below format. Such multiplexing may occur using data manipulation, such as horizontal-to-vertical manipulation as in FIGS. 13a, 13b, 14a, and 14b. Pixel chroma components may be rearranged at point 1502, where chroma rearrangement refers to the YUV 4:2:2 technique discussed above. Dashed lines used for elements in FIG. 15 represent optional components and/or functionality. Data may be combined into a precursor format at point 1503, and data may be compressed using compression block 1504. The result is a single frame 1550, transmittable over common transmission channels, that is in fact transmitted to another location or functional entity. Data may be decompressed at point 1505, which is typically at the remote location or functional entity.

Point 1506 indicates data may be extracted from the precursor format, and pixel chroma components may be rearranged on the demultiplexer side at point 1507. Demultiplexer 1508 demultiplexes the received frame 1550 into a stereo pair 1500', typically employing multiple pixels from the received frame 1550 to determine the value and appearance of each pixel in the demultiplexed stereo pair. Sharpening may occur at point 1509. Calculations may be performed as described herein when demultiplexing, including use of certain factors that may be dictated by circumstances and/or sharpening or other desired performance metrics.

Figure 16:
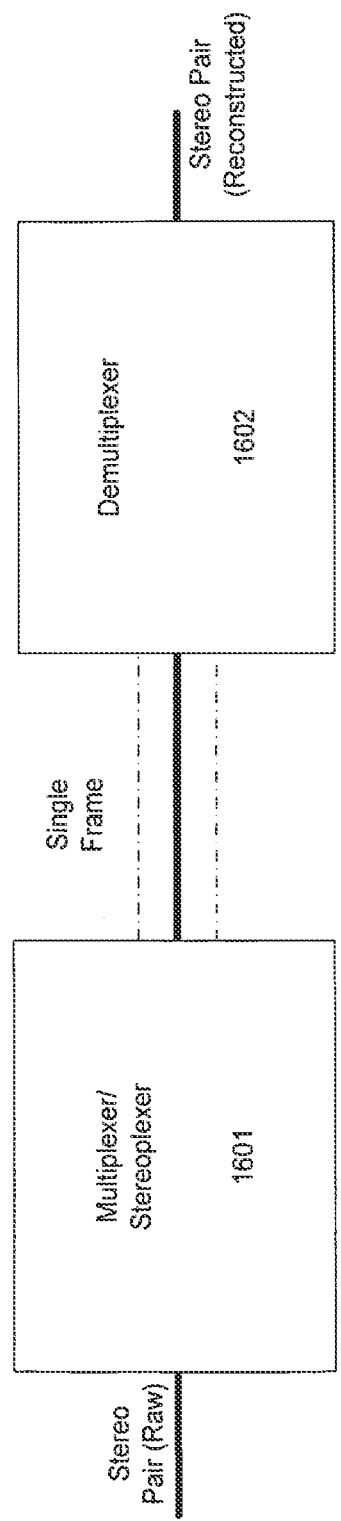
FIG. 16 is a generalized representation of the overall system design.

A highly simplified version of a design performing in accordance with the present multiplexing/demultiplexing functionality is shown in FIG. 16. From FIG. 16, Multiplexer/Steroplexer 1601 receives a stereo pair and converts the stereo pair by the functionality described herein into a single frame. The single frame is transmitted from Multiplexer/Steroplexer 1601 to Demultiplexer 1602, which may be at a different location or at the same location as Multiplexer/Steroplexer 1601. The single frame may be transmitted by any conventional means, including but not limited to wireless transmission, wired transmission, placing the single frame on a physical disk and transmitting the disk to the Demultiplexer 1602, and so forth.

While the term "stereo pair" and "single frame" is employed in FIGS. 15 and 16, it is to be understood that this may represent several stereo pairs and several frames in the case of a moving image comprising multiple stereo pairs. As discussed, each stereo pair in a multiple frame stereoscopic moving image is subjected to the multiplexing/stereoplexing process described, resulting in multiple "single frames," which may then be combined at the demultiplexer into multiple stereo frames that can be played or combined to form a moving image.

Thus the present design includes a method for demultiplexing a stream of single frames divided into portions, each single frame representing a frame of one stereoscopic image and containing one right image in a first portion and one left image in a second portion, each portion having been compressed using a compression function. The method comprises receiving the stream of single frames divided into portions, each single frame representing a frame of one stereoscopic image, and performing a reverse compression function on at least one of the portions, the reverse compression function substantially processing pixels in the at least one portion in a manner substantially the reverse of the compression function used to compress each portion. Performing the reverse compression function substantially reverts the portion to a state similar to that prior to being compressed using the compression function, thus forming a part of a stereo pair configured for projection.

Alternately, the present design may be considered to include a method for demultiplexing frames of compressed image data comprising a series of left compressed images and a series of right compressed images, the right compressed images and left compressed images compressed using a compression function. The method comprises receiving the frames of compressed image data via a medium configured to transmit images in single frame format, and performing an expansion function on frames of compressed image data, the expansion function configured to select pixels from the series of left compressed images and series of right compressed images to produce replacement pixels to form a substantially decompressed set of stereo image pairs.

According to an overall comprehensive view of the present design, the present design includes a system configured to provide stereoscopic images. The system comprises a multiplexer configured to receive a plurality of stereo pairs, compress said stereo pairs into compressed portions, and combine the compressed portions into a series of single frames representing the plurality of stereo pairs, a transmission medium configured to transmit single frames of image data and configured to receive the series of single frames, and a demultiplexer configured to receive the series of frames from the transmission medium and decompress the series of single frames into a reconstructed plurality of stereo pairs.

Multiplexing processes such as staggering, alternating, filtering, variable scaling, and sharpening from original, uncompressed right and left images may be employed alone or in combination, and selected or predetermined regions or segments from uncompressed images may have more pixels removed or combined than other regions, or otherwise compressed to different quality levels than other regions.

The multiplexing and demultiplexing design presented herein and the specific aspects illustrated are meant not to be limiting, but may include alternate components while still incorporating the teachings and benefits of the invention. While the invention has thus been described in connection with specific embodiments thereof, it will be understood that the invention is capable of further modifications. This application is intended to cover any variations, uses or adaptations of the invention following, in general, the principles of the invention, and including such departures from the present disclosure as come within known and customary practice within the art to which the invention pertains.

The foregoing description of specific embodiments reveals the general nature of the disclosure sufficiently that others can, by applying current knowledge, readily modify and/or adapt the system and method for various applications without departing from the general concept. Therefore, such adaptations and modifications are within the meaning and range of equivalents of the disclosed embodiments. The phraseology or terminology employed herein is for the purpose of description and not of limitation.

The invention claimed is:

1. A method for multiplexing comprising:
   generating a first scaled image from a first original image, the first scaled image having a central portion and an edge portion, the central and edge portions of the first scaled image having been downscaled by first and second scaling factors, respectively, wherein the first and second scaling factors are different and both less than one;
   creating a multiplexed single frame divided into portions, the multiplexed single frame comprising the first scaled image in a first portion and a second image in a second portion; and
   wherein an aspect ratio of the first original image and an aspect ratio of the multiplexed single frame are substantially the same.

2. The method of claim 1, wherein the second image in the multiplexed single frame is a second scaled image that was scaled from a second original image, the second scaled image having a central portion and an edge portion, the central and edge portions of the second scaled image having been scaled by a third scaling factor and a fourth scaling factor, respectively, the third and fourth scaling factors being different.

3. The method of claim 2, wherein the first and third scaling factors are substantially the same.

4. The method of claim 3, wherein the second and fourth scaling factors are substantially the same.

5. The method of claim 1, wherein the first scaled image further comprises an intermediate portion between the central and edge portions, the intermediate portion of the first scaled image having been scaled by at least an intermediate portion scaling factor.

6. The method of claim 5, wherein the scaling factor is fixed across the intermediate portion and is different from the first and second scaling factors.

7. The method of claim 5, wherein the scaling factor is continuously variable across the intermediate portion.

8. The method of claim 1, wherein generating the first scaled image comprises computing a plurality of output pixels in the first scaled image based on a plurality of source pixels in the first original image.

9. The method of claim 8, wherein computing comprises employing a series of weighting factors based on positions of the plurality of source pixels, the series of weighting factors comprising at least two different weighting factors.

10. The method of claim 8, wherein computing comprises selecting the plurality of source pixels aligned along one axis of the scaled image and calculating the plurality of output pixels aligned orthogonally to the one axis.

11. A system configured to provide a multiplexed single frame divided into portions, the system comprising:
    a multiplexer configured to:
        generate a first scaled image from a first original image, the first scaled image having a central portion and an edge portion, the central and edge portions of the first scaled image having been downscaled by first and second scaling factors, respectively, wherein the first and second scaling factors are different and both less than one;
        create a multiplexed single frame divided into portions, the multiplexed single frame comprising the first scaled image in a first portion and a second image in a second portion; and
        wherein an aspect ratio of the first original image and an aspect ratio of the multiplexed single frame are substantially the same; and
    an interface configured to provide the multiplexed single frame comprising the first scaled image.

12. The system of claim 11, wherein the second image in the multiplexed single frame is a second scaled image that was scaled from a second original image, the second scaled image having a central portion and an edge portion, the central and edge portions of the second scaled image having been scaled by a third scaling factor and a fourth scaling factor, respectively, the third and fourth scaling factors being different.

13. The system of claim 12, wherein the first and third scaling factors are substantially the same.

14. The system of claim 12, wherein the second and fourth scaling factors are substantially the same.

15. The system of claim 11, wherein the first scaled image further comprises an intermediate portion between the central and edge portions, the intermediate portion of the first scaled image having been scaled by at least an intermediate scaling factor.

16. The system of claim 15, wherein the intermediate scaling factor is fixed across the intermediate portion and is different from the first and second scaling factors.

17. The system of claim 15, wherein the intermediate scaling factor is continuously variable across the intermediate portion.

18. The system of claim 11, wherein the multiplexer is configured to generate the first scale image by computing a plurality of output pixels in the first scaled image based on a plurality of source pixels in the first original image.

19. The system of claim 18, wherein the multiplexer is configured to compute the output pixels by employing a series of weighting factors based on positions of the plurality of source pixels, the series of weighting factors comprising at least two different weighting factors.

20. The system of claim 18, wherein the multiplexer is configured to compute the output pixels by selecting the plurality of source pixels aligned along one axis of the scaled image and calculating the plurality of output pixels aligned orthogonally to the one axis.

21. The system of claim 11, wherein the interface is configured to provide the multiplexed single frame over a medium formatted to transmit single frames of image data.

* * * * *